(12) United States Patent
An et al.

(10) Patent No.: US 11,390,979 B2
(45) Date of Patent: Jul. 19, 2022

(54) WASHING MACHINE

(71) Applicant: LG Electronics Inc., Seoul (KR)

(72) Inventors: Yongjun An, Seoul (KR); Seongno Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 739 days.

(21) Appl. No.: 16/204,595

(22) Filed: Nov. 29, 2018

(65) Prior Publication Data

US 2019/0161901 A1 May 30, 2019

(30) Foreign Application Priority Data

Nov. 29, 2017 (KR) .......................... 10-2017-0161829

(51) Int. Cl.
*D06F 37/40* (2006.01)
*D06F 23/04* (2006.01)
(Continued)

(52) U.S. Cl.
CPC .............. *D06F 37/40* (2013.01); *D06F 23/04* (2013.01); *D06F 37/12* (2013.01); *D06F 37/206* (2013.01);
(Continued)

(58) Field of Classification Search
CPC ........ D06F 37/40; D06F 37/304; D06F 37/30; D06F 37/12; D06F 37/206; D06F 37/24; D06F 23/04; D06F 17/08; F16H 1/28
(Continued)

(56) References Cited

U.S. PATENT DOCUMENTS 2,331,700 A * 10/1943 Kirby ...................... D06F 23/04
68/23.5
2,580,435 A * 1/1952 Kirby ...................... D06F 37/24
68/152
(Continued)

FOREIGN PATENT DOCUMENTS

| CN | 1683697 | 10/2005 |
| CN | 1683698 | 10/2005 |

(Continued)

OTHER PUBLICATIONS

Yoon, SeongNo, "Shock-absorbing structure for bearing for supporting drive shaft of washer", Apr. 2005, KR 20050036416A—Machine Translation (Year: 2005).*

(Continued)

*Primary Examiner* — Michael E Barr
*Assistant Examiner* — Thomas Bucci
(74) *Attorney, Agent, or Firm* — Fish & Richardson P.C.

(57) ABSTRACT

A washing machine includes a casing, an outer tub, an inner tub, a pulsator, and a driving mechanism configured to cause rotation of at least one of the inner tub or the pulsator. The driving mechanism includes a drive motor including a stator and a rotor, a bearing housing located below the outer tub, a hollow spinning shaft coupled to the inner tub, a coupler configured to selectively connect the spinning shaft to the rotor based on moving upward and downward along an outer circumferential surface of the spinning shaft, a washing shaft located in the spinning shaft and configured to rotate the pulsator, where the washing shaft has a lower part connected to the rotor and an upper part connected to the pulsator, and an anti-friction member located between the spinning shaft and the washing shaft and configured to reduce friction between the spinning shaft and the washing shaft.

20 Claims, 14 Drawing Sheets

(51) Int. Cl.
  *D06F 37/12* (2006.01)
  *D06F 37/20* (2006.01)
  *F16H 1/28* (2006.01)
  *D06F 37/24* (2006.01)
  *F16C 19/10* (2006.01)
  *F16C 19/04* (2006.01)

(52) U.S. Cl.
  CPC ............... *F16H 1/28* (2013.01); *D06F 37/24* (2013.01); *F16C 19/04* (2013.01); *F16C 19/10* (2013.01); *F16C 2314/00* (2013.01)

(58) Field of Classification Search
  USPC .......................................................... 68/133
  See application file for complete search history.

(56) References Cited

U.S. PATENT DOCUMENTS

| | | | | | |
|---|---|---|---|---|---|
| 2,957,331 | A | * | 10/1960 | Bruckman | D06F 37/24 68/23.3 |
| 3,057,218 | A | * | 10/1962 | Knerr | F16H 7/02 248/666 |
| 3,091,107 | A | * | 5/1963 | Rhodes | D06F 37/145 68/4 |
| 3,314,257 | A | * | 4/1967 | Fosler | D06F 13/04 68/23.6 |
| 6,332,343 | B1 | * | 12/2001 | Koketsu | D06F 37/304 68/12.02 |
| 2005/0166643 | A1 | * | 8/2005 | Cho | D06F 37/304 68/132 |
| 2005/0210603 | A1 | * | 9/2005 | Houser | D06F 37/24 68/23.1 |
| 2013/0095974 | A1 | * | 4/2013 | Imai | F02C 3/107 475/159 |
| 2013/0111676 | A1 | * | 5/2013 | Jun | H02K 29/08 8/137 |
| 2013/0199247 | A1 | * | 8/2013 | Lee | D06F 37/40 68/131 |
| 2016/0377144 | A1 | * | 12/2016 | McLean | D06F 37/24 248/634 |
| 2017/0292216 | A1 | * | 10/2017 | Goshgarian | D06F 37/40 |
| 2018/0105970 | A1 | * | 4/2018 | Basheer | D06F 37/40 |
| 2018/0156335 | A1 | * | 6/2018 | Lv | D06F 37/20 |
| 2018/0266033 | A1 | * | 9/2018 | Liu | D06F 37/40 |

FOREIGN PATENT DOCUMENTS

| | | |
|---|---|---|
| CN | 1683699 | 10/2005 |
| CN | 1683700 | 10/2005 |
| CN | 105734904 | 7/2016 |
| CN | 107287829 | 10/2017 |
| JP | H0274293 | 3/1990 |
| JP | H0380896 | 4/1991 |
| JP | H11114283 | 4/1999 |
| JP | H11244577 | 9/1999 |
| KR | 1020010079463 | 8/2001 |
| KR | 10-2004-0071430 | 8/2004 |
| KR | 1020040071393 | 8/2004 |
| KR | 1020040071430 | 8/2004 |
| KR | 20050036416 A * | 4/2005 |
| KR | 1020050036416 | 4/2005 |
| KR | 1020050064926 | 6/2005 |
| KR | 10066213 9 | 12/2006 |
| KR | 1020130090164 | 8/2013 |
| WO | WO2016101806 | 6/2016 |

OTHER PUBLICATIONS

Australian Examination Report in Australian Application No. 2018271292, dated Apr. 24, 2019, 8 pages.
Australian Office Action in Australian Application No. 2018271292, dated Nov. 26, 2019, 6 pages.
Chinese Office Action in Chinese Appln. No. 201811443297.3, dated Aug. 19, 2020, 16 pages (with English translation).
Wang Jianqiong, "Mechanical Shaft Design Basis," Chapter Four: Reducer Structure Design, dated Aug. 31, 2014, 3 pages (with English translation).
Notice of Allowance in Chinese Appln. No. 201811443297.3, dated Aug. 30, 2021, 7 pages (with English translation).
Office Action in Korean Appln. No. 10-2017-0161829, dated Nov. 17, 2021, 11 pages (with English translation).

* cited by examiner

FIG. 13

| No | thickness [mm] | moving Stroke [mm] | initial load [mm] | Max load [mm] | noises level |
|---|---|---|---|---|---|
| 1 | 0.5 | 0.2 | 38.4 | 48 | 0 |
| 2 | 0.5 | 0.3 | 33.6 | 48 | 0 |
| 3 | 0.5 | 0.4 | 28.8 | 48 | 1 |
| 4 | 0.3 | 0.1 | 15.4 | 16.8 | 0 |
| 5 | 0.3 | 0.2 | 14 | 16.8 | 1 |
| 6 | 0.3 | 0.3 | 12.6 | 16.8 | 2 |
| 7 | 0.3x2 | 0.1 | 12 | 14.4 | 0 |
| 8 | 0.3x2 | 0.2 | 9.6 | 14.4 | 1 |
| 9 | 0.2 | 0.1 | 10.2 | 11.9 | 0 |
| 10 | 0.2 | 0.2 | 9.35 | 11.9 | 1 | noises level
noise level 0: no noise
noise level 1: a case when the user put ears close to the machine and hears noise
noise level 3 : a case when a user in front of the machine hears noise
noise level 4 : a case where noise is heard at a distance of 5 m from the machine

FIG. 14

| Case | conventional approach H=1.2, t=0.6 | | | | | | conventional approach H=1.2, t=0.6 | | | | | |
|---|---|---|---|---|---|---|---|---|---|---|---|---|
| | Free (load-free) | Free (full-load) | 0.2-0.1 (middle) | | 0.1-0.2 (lower limit) | | Free (load-free) | Free (full-load) | 0.2-0.1 (middle) | | 0.1-0.2 (lower limit) | |
| | | | Set | Set | Set | Full | | | Set | Set | Set | Full |
| D [mm] | 18.3 | 18.3 | 18.3 | 18.3 | 18.3 | 18.3 | 18.3 | 18.3 | 18.3 | 18.3 | 18.3 | 18.3 |
| d [mm] | 12.3 | 12.3 | 12.3 | 12.3 | 12.3 | 12.3 | 12.3 | 12.3 | 12.3 | 12.3 | 12.3 | 12.3 |
| t [mm] | 0.6 | 0.6 | 0.6 | 0.6 | 0.6 | 0.6 | 0.6 | 0.6 | 0.6 | 0.6 | 0.6 | 0.6 |
| N [number of bending, No.] | 3 | 3 | 3 | 3 | 3 | 3 | 3 | 3 | 3 | 3 | 3 | 3 |
| L [load-free, mm] | 1.2 | 0.6 | 1 | 0.9 | 1.1 | 0.9 | 0.9 | 0.6 | 0.7 | 0.6 | 0.8 | 0.6 |
| δ [displacement, mm] | 0 | 0.6 | 0.2 | 0.3 | 0.1 | 0.3 | 0 | 0.3 | 0.2 | 0.3 | 0.1 | 0.3 |
| E [elastic modulus] | 206000 | 206000 | 206000 | 206000 | 206000 | 206000 | 206000 | 206000 | 206000 | 206000 | 206000 | 206000 |
| P [kgf] | 0.0 | 80.5 | 26.8 | 40.3 | 13.4 | 40.3 | 0.0 | 40.3 | 26.8 | 40.3 | 13.4 | 40.3 |
| σ [MPa] | 0.0 | 1193.7 | 397.9 | 596.9 | 199.0 | 596.9 | 0.0 | 596.9 | 397.9 | 596.9 | 199.0 | 596.9 |
| K [kgf/mm] | | 134.2 | 134.2 | 134.2 | 134.2 | 134.2 | | 134.2 | 134.2 | 134.2 | 134.2 | 134.2 |
| T.S | 1600.0 | 1600.0 | 1600.0 | 1600.0 | 1600.0 | 1600.0 | 1600.0 | 1600.0 | 1600.0 | 1600.0 | 1600.0 | 1600.0 |
| Y.S | 1200.0 | 1200.0 | 1200.0 | 1200.0 | 1200.0 | 1200.0 | 1200.0 | 1200.0 | 1200.0 | 1150.0 | 1200.0 | 1200.0 |
| {S-Sx}/S | 1.000 | 0.254 | 0.751 | 0.627 | 0.876 | 0.627 | 1.000 | 0.627 | 0.751 | 0.627 | 0.876 | 0.627 |
| X (lifespan coefficient) | | | 0.834 | | 0.716 | | | | 0.834 | | 0.716 | |
| lifespan (times) | | | 1,000,000 ↑ | | 1,000,000 ↑ | | | | 1,000,000 ↑ | | 1,000,000 ↑ | |

WASHING MACHINE

CROSS-REFERENCE TO RELATED APPLICATIONS

The present application claims, in accordance with Article 119 (35) and Article 365 (35) of the United States Patent Act, a priority to Korean Patent Application No. 10-2017-0161829 filed on Nov. 29, 2017, the entirety of which is incorporated herein by reference.

BACKGROUND

1. Field

The present disclosure relates to a washing machine.

2. Related Art

Generally, a washing machine includes an outer tub containing wash-water and a drum rotatably provided in the outer tub to accommodate clothes (hereinafter referred to as "laundry"). Washing and spinning of laundry are done as the drum rotates.

The washing machine may be classified into a top loading type in which the rotational axis of the drum is arranged vertically and laundry is designed to be able to be loaded from above, and a front loading type designed to allow the laundry to be injected from the front in which the rotation axis of the drum is arranged horizontally or inclined in a direction of lowering toward the rear end.

The top loading washing machine may be divided into an agitator type and pulsator type. In the agitator type, a protruding washing rod disposed at the center of the drum is rotated to perform washing, while in the pulsator type, a disc-shaped pulsator or drum formed at the bottom of the drum is rotated to wash the laundry.

The front loading type is commonly referred to as a drum type washing machine in which a lifter is provided on the inner circumferential face of the drum. Thus, as the drum rotates, the lifter lifts the laundry and drops, thereby performing washing.

Korean Patent Application Laid-Open No. 10-2004-0071430 (published on Aug. 12, 2004, hereinafter referred to as a prior art) discloses a top loading type automatic washing machine.

The washing machine presented in the prior art includes a driving mechanism including a driving motor which provides a driving force, a spinning shaft for rotating the outer tub, a washing shaft for driving the pulsator, and a coupler for selectively driving the spinning shaft and washing shaft.

The coupler transmits the rotation force generated by the drive motor to the pulsator in the washing mode and to the pulsator and the outer tub simultaneously in the spinning mode. That is, the washing shaft is always coupled to the drive motor, while the spinning shaft is selectively coupled to the drive motor. For this purpose, the coupler may be engaged with the spinning shaft and may be moved up and down. The outer circumferential face of the coupler has a serration that may engage the rotor of the drive motor. Thus, when the coupler rises, the coupler releases the coupling between the spinning shaft and the rotor. When the coupler is lowered, the coupler couples with the rotor to transmit the rotation force of the rotor to the spinning shaft.

In the conventional washing machine disclosed in the prior art, when the pulsator and the washing shaft alternately rotate between opposing both sides, a thrust occurs in the gear module. Due to the thrust, a collision occurs between an up/down part reciprocating up and down and a fixed part maintaining a relatively fixed state in comparison with the up/down part. As a result, there has been a problem that impact noise and deformation and damage of the parts are generated.

Further, even in the case of product falling during the product packaging and product placement, impact between the fixed part and the rising/falling part occurs. Thus, damage or breakage of the parts may occur.

SUMMARY

The present disclosure proposes a washing machine to solve the above problem in which the washing shaft may be firmly fixed within the spinning shaft, and with the spinning shaft being fixed, a single rotation of the washing shaft may be made smoothly and stably.

Further, the present disclosure proposes a washing machine in which a sun gear and a lower washing shaft are integrally formed so that the power transmission rate may be further improved.

Further, the present disclosure suggests a washing machine to effectively reduce impact and noise generated by a collision between a retaining ring fixed to a washing shaft and an anti-friction member fixed to the spinning shaft due to the thrust generated in the axial direction.

Further, the present disclosure suggests a washing machine that may completely prevent collision between the anti-friction member and the retaining ring via an application of a wave-shaped washer having an allowable load greater than thrust.

Further, the present disclosure proposes a washing machine capable of preventing abrasion of an intensively loaded portion during repeated contacts between the retaining ring and wave-shaped washer or between the wave-shaped washer and anti-friction member and of increasing the fatigue life of the wave-shaped washer.

Further, the present disclosure suggests a washing machine which, when the machine is packaged or placed, may mitigate a momentary impact that may be imposed on the wave-shaped washer, thereby preventing plastic deformation or breakage of the wave-shaped washer.

Further, the present disclosure suggests a washing machine in which even when the wave-shaped washer is broken, the wave-shaped washer is not randomly dislodged but remains between the auxiliary washers, and it is also possible to reduce the noise generated by the contact between the broken wave-shaped washer and the retaining ring or anti-friction member.

Further, the present disclosure proposes a washing machine in which when the wave-shaped washer and auxiliary washer are deformed beyond a reference value, the bottom of the lower spinning shaft contacts the top of the shaft-retaining boss first, such that the bottom of the anti-friction member contacts the top of the shaft-retaining boss, and, thus, the anti-friction member may be prevented from being damaged by the impact.

In one aspect, there is provided a washing machine comprising: a casing; an outer tub disposed inside the casing for receiving washing-water therein; an inner tub disposed inside the outer tub for receiving laundry therein; a pulsator disposed inside the inner tub so as to rotate via receiving a driving force; and a driving mechanism configured to provide the driving force to rotate the inner tub and the pulsator, wherein the driving mechanism includes: a drive motor including a stator and a rotor; a bearing housing disposed under the outer tub; a hollow spinning shaft having a lower end adjacent to the rotor and an upper end coupled to the inner tub; a coupler moving upwardly or downwardly along an outer circumferential face of the lower end of the spinning shaft for selectively connecting the spinning shaft to the rotor; a washing shaft received within the hollow spinning shaft, wherein the washing shaft has a lower end connected to the rotor, and an upper end connected to the pulsator to rotate the pulsator; and an anti-friction member interposed between the spinning shaft and the washing shaft.

In one embodiment, the anti-friction member includes a bearing.

In one embodiment, at least one of an outer circumferential face of the washing shaft or an inner circumferential face of the spinning shaft has a seating groove defined therein for receiving the anti-friction member.

In one embodiment, an outer circumferential face of the washing shaft and an inner circumferential face of the spinning shaft are spaced from each other in at least a portion thereof.

In one embodiment, the bearing housing accommodates therein a planetary gear module configured to regulate a rotational ratio of the drive motor and to transmit the driving force to the washing shaft.

In one embodiment, the planetary gear module includes: a sun gear configured to receive a rotation force from the drive motor to rotate, wherein the sun gear has teeth formed on an outer circumferential face thereof; a plurality of planetary gears, each having teeth formed on an outer circumferential face thereof, wherein the planetary gears mesh with the sun gear to rotate around the sun gear together with the rotation of the sun gear; a ring gear having teeth formed on an inner circumferential face thereof, wherein the ring gear is positioned coaxially with the sun gear, wherein the ring gear is meshed with the planetary gears; and a carrier rotatably coupled to a rotation shaft of each of the plurality of planetary gears, wherein the carrier rotates coaxially with the sun gear.

In one embodiment, the washing shaft includes: a lower washing shaft having a top connected to a bottom of the sun gear and having a bottom connected to the rotor; and an upper washing shaft having a top connected to the pulsator and having a bottom connected to the carrier.

In one embodiment, the lower washing shaft is integral with the sun gear.

In one embodiment, the spinning shaft includes: a lower spinning shaft having a bottom selectively connected to the rotor via the coupler and having a top connected to the ring gear; and an upper spinning shaft having a bottom connected to the ring gear and having a top connected to the inner tub.

In one embodiment, the teeth of the sun gear, planetary gears and ring gear of the planetary gear module include teeth defining a helical gear.

In one embodiment, an outer circumferential face of the washing shaft has a retaining groove recessed inwardly therein along a circumferential direction thereof, wherein the retaining groove receives an inner circumferential face portion of a retaining ring, wherein an outer circumferential face of the retaining ring protrudes outwardly beyond the washing shaft.

In one embodiment, an inner circumferential face of the spinning shaft has a seating groove defined therein for receiving the anti-friction member.

In one embodiment, a wave-shaped washer is interposed between the anti-friction member and the retaining ring.

In one embodiment, an auxiliary washer is further interposed between the anti-friction member and the retaining ring.

In one embodiment, the auxiliary washer is interposed between the anti-friction member and the wave-shaped washer and/or between the wave-shaped washer and the retaining ring.

In one embodiment, the auxiliary washer is made of a resin material.

In one embodiment, upon deformation of the wave-shaped washer and auxiliary washer, a bottom of the spinning shaft contacts a top of a shaft-retaining boss, wherein the shaft-retaining boss defines a central portion of the rotor and has a shaft passing-through hole for receiving the washing shaft.

In accordance with the present disclosure, the washing shaft may be firmly fixed within the spinning shaft, and with the spinning shaft being fixed, a single rotation of the washing shaft may be made smoothly and stably.

Further, the sun gear and the lower washing shaft may be integrally formed so that the power transmission rate may be further improved.

Further, the present washing machine may effectively reduce impact and noise generated by the collision between the retaining ring fixed to the washing shaft and the anti-friction member fixed to the spinning shaft due to the thrust generated in the axial direction.

Further, the present washing machine may completely prevent collision between the anti-friction member and the retaining ring via an application of the wave-shaped washer having an allowable load greater than thrust.

Further, the present washing machine may be capable of preventing abrasion of the intensively loaded portion during repeated contacts between the retaining ring and wave-shaped washer or between the wave-shaped washer and anti-friction member and of increasing the fatigue life of the wave-shaped washer.

Further, when the present washing machine is packaged or placed, the machine may mitigate a momentary impact that may be imposed on the wave-shaped washer, thereby preventing plastic deformation or breakage of the wave-shaped washer.

Further, even when the wave-shaped washer is broken, the wave-shaped washer is not randomly dislodged but remains between the auxiliary washers, and it is also possible to reduce the noise generated by the contact between the broken wave-shaped washer and the retaining ring or anti-friction member.

Further, when the wave-shaped washer and auxiliary washer are deformed beyond a reference value, the bottom of the lower spinning shaft contacts the top of the shaft-retaining boss first, such that the bottom of the anti-friction member contacts the top of the shaft-retaining boss, and, thus, the anti-friction member may be prevented from being damaged by the impact.

BRIEF DESCRIPTION OF THE DRAWINGS

FIG. 13 is a table showing results of detecting noise presence or absence when applying the wave-shaped washer.

FIG. 14 is a table showing results of testing allowable loads and expected lifespans according to specifications of the wave-shaped washer when applying the wave-shaped washer.

DETAILED DESCRIPTIONS

Hereinafter, specific embodiments of the present disclosure will be described with reference to the drawings. However, a spirit of the present disclosure is not limited to the embodiment as presented. Those skilled in the art, upon understanding the spirit of the present disclosure, may readily suggest other embodiments within a scope of the same spirit.

Hereinafter, a top-loading washing machine in which laundry is injected and drawn out through a top of the washing machine is exemplified. The present disclosure is not limited to this.

Figure 1:
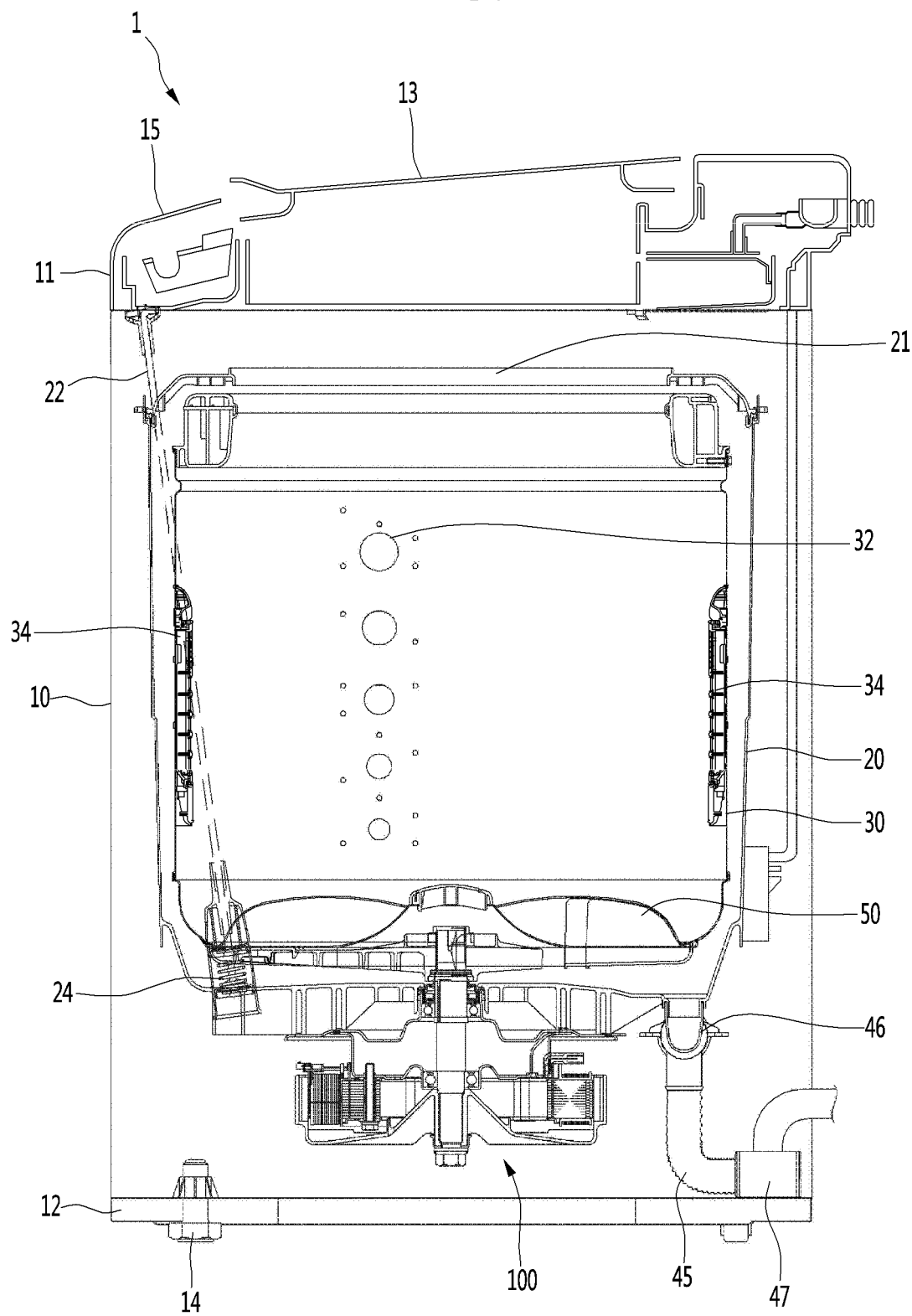
FIG. 1 is a cross-sectional view of a washing machine according to an embodiment of the present disclosure.

FIG. 1 is a cross-sectional view of a washing machine according to an embodiment of the present disclosure.

Referring to FIG. 1, a washing machine 1 according to an embodiment of the present disclosure may include a casing 10 forming an exterior appearance, a top cover 11 disposed at a top of the casing 10, and a base 12 disposed at the bottom of the casing 10.

The casing 10 has an internal space and is formed in a rectangular shape. The top and bottom of the casing are opened. The interior of the casing 10 may have various units required for washing.

The top cover 11 is placed in the open top of the casing 10. The top cover has a laundry receiving hole (not shown) defined therein for receiving the laundry. Further, the top cover 11 is provided with a door 13, which can open and close the laundry receiving hole. For example, the door 13 may be configured to pivotally move by the user.

The base 12 is arranged to shield the open bottom of the casing 10. On the bottom face of the base 12, one or more legs 14 are disposed, whereby the base 12 is spaced from the bottom surface. Further, the operator may adjust the level of the washing machine 1 by rotating the legs 14.

Further, the washing machine 1 includes a control panel 15 containing various functional units which may control the washing machine 1. The control panel 15 may be provided on the top face of the top cover 11.

The control panel 15 may include various inputs provided to allow the user to operate the washing machine 1, and a display that may indicate to the user a status of the washing machine 1. Further, in the control panel 15, various PCBs (not shown) and the like may be arranged to control a configuration of the washing machine 1 according to signals input by the input unit.

The interior space of the washing machine 1, as defined by the casing 10, the top cover 11 and the base 12, may accommodates a cylindrical outer tub 20 and an inner tub 30. The inner tub 30 has a smaller diameter than the outer tub 20 so that the inner tub 30 is accommodated inside the outer tub 20.

The outer tub 20 contains washing-water for laundry washing. The outer tub 20 is formed in a cylindrical shape. In the top face of the outer tub, an opening 21 through which laundry may enter and exit may be defined.

The outer tub 20 may be spaced upwards from the base 12 by a predetermined gap, by the support member 22 inside the casing 10. For example, a top of the support member 22 may be secured to the top of the casing 10, while a bottom of the support member may be coupled to the bottom of the outer tub 20. Further, at the bottom of the support member 22, a damper 24 for absorbing vibrations generated from the outer tub 20 and the inner tub 30 may be disposed.

The damper 24 may include a spring that absorbs vibration transmitted from the inner tub 30 or a driving mechanism 100, which will be described later, to the outer tub 20, via elastic deformation.

The inner tub 30 may be defined as a washing tub rotating by a driving mechanism 100 to be described later for laundry washing, rinsing and spinning. The inner tub 30 may be received within the outer tub 20. An outer surface of the inner tub 30 is separated from an inner surface of the outer tub 2 by a certain distance.

In a side portion of the inner tub 30, a plurality of washing water holes 32 through which wash-water flows may be defined. Thus, the washing-water supplied into the outer tub 20 may flow into the inner tub 30 through the plurality of washing water holes 32.

Further, on an inner circumferential face of the inner tub 30, a filter unit 34 for collecting various foreign substances including lint contained in the washing-water may be disposed. A plurality of filter units 34 may be arranged along the circumferential direction of the inner tub 30.

In one example, the washing machine 1 includes a water supply channel connected to an external water source for supplying the washing water into the outer tub 20 and the inner tub 30. The water supply channel may be provided with a water supply valve that opens and closes the water supply channel. A plurality of water supply valves may be arranged according to the kinds of water to be supplied. In one example, the water supply valves may include a hot water valve and a cold water valve.

Further, the washing machine 1 includes a water discharge channel 45 for draining washing-water from the outer tub 20 and the inner tub 30 to the outside of the washing machine 1. The water discharge channel 45 is provided with a drain valve 46 for opening and closing the water discharge channel 45. Further, the water discharge channel 45 may be further provided with a drain pump 47 for pumping washing-water drained to the water discharge channel 45 to the outside.

Further, at the bottom of the inner tub 30, a pulsator 50, which generates a water flow for washing, is rotatably disposed.

Further, the washing machine 1 includes a driving mechanism 100 configured to provide power to rotate the inner tub 30 or the pulsator 50. The driving mechanism 100 includes a spinning shaft for rotating the inner tub 30 and a washing shaft for rotating the pulsator 50. The mechanism 100 selectively rotates the spinning shaft and the washing shaft.

Figure 2:
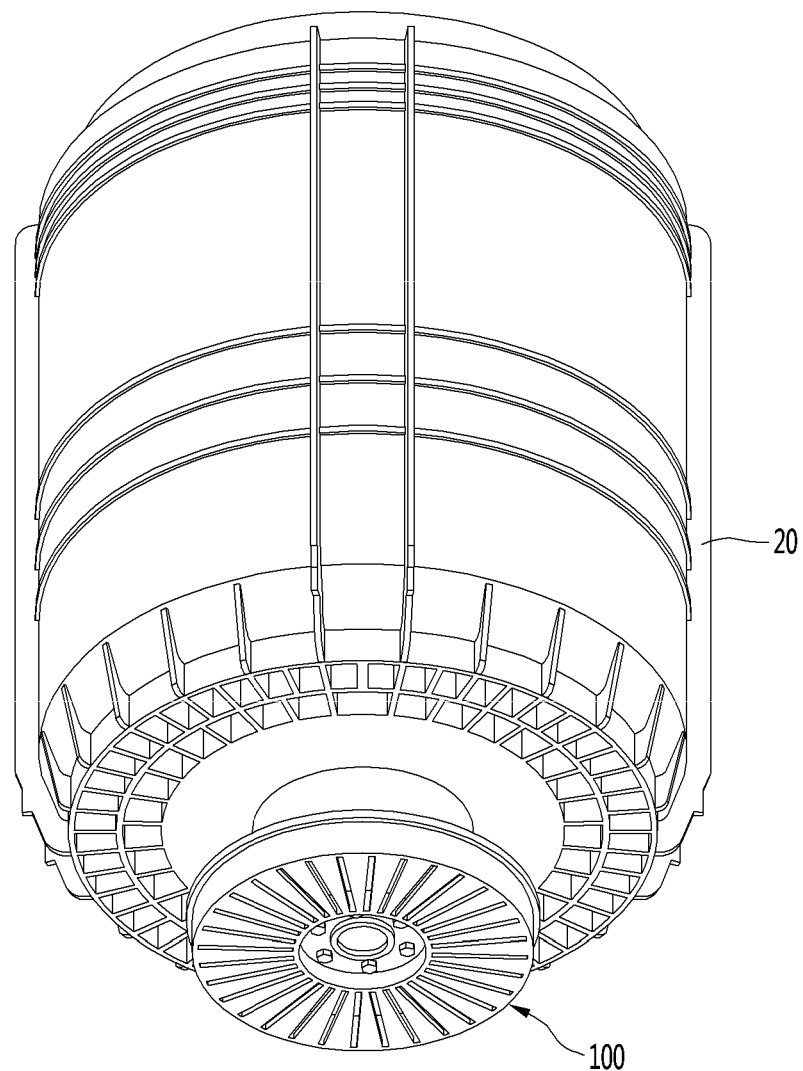
FIG. 2 is a perspective view showing a driving mechanism disposed on an outer tub according to an embodiment of the present disclosure
Figure 3:
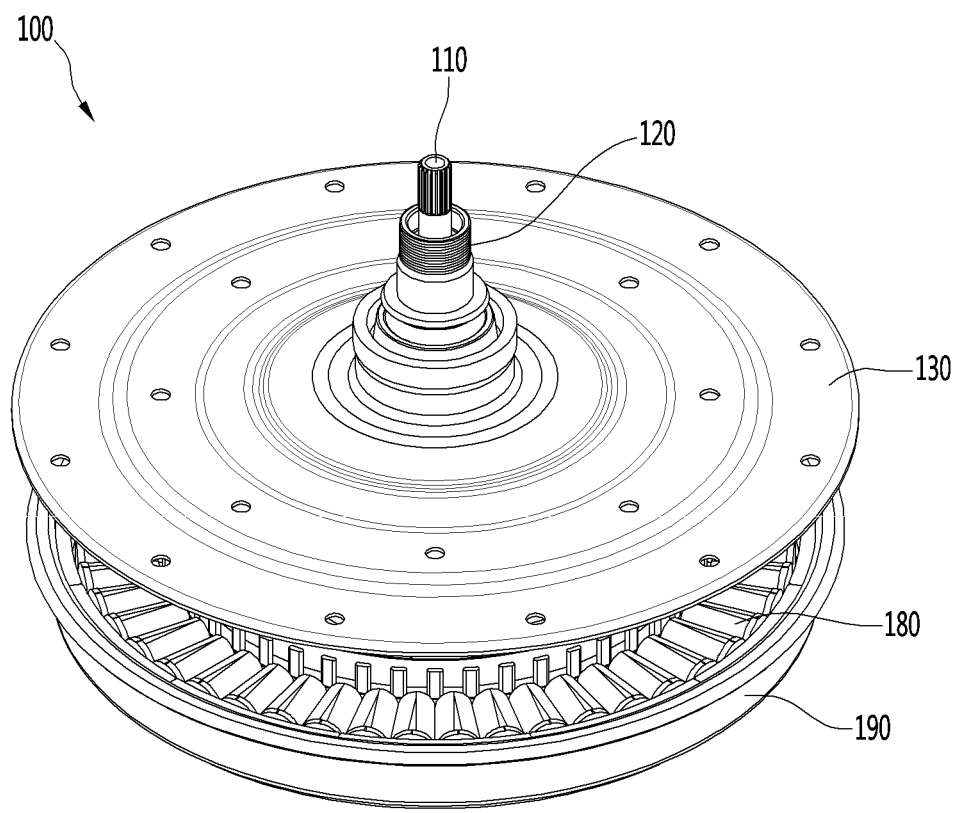
FIG. 3 is a perspective view showing the driving mechanism.
Figure 4:
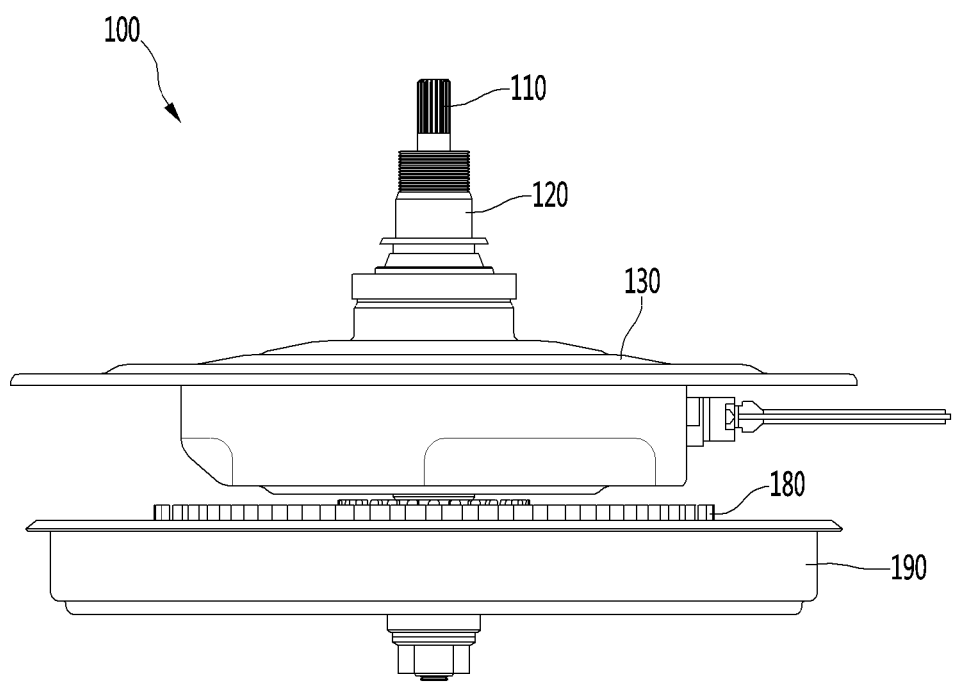
FIG. 4 is a side elevation view of the driving mechanism.

FIG. 2 is a bottom perspective view of the outer tub with the driving mechanism according to the embodiment of the present disclosure. FIG. 3 is a perspective view of the driving mechanism. FIG. 4 is a side elevation view of the driving mechanism.

Referring to FIG. 2 to FIG. 4, the driving mechanism 100 according to an embodiment of the present disclosure is disposed at the bottom of the outer tub 20. The driving mechanism 100 may be understood as means for providing power for rotating the pulsator 50 or for rotating the pulsator 50 and the inner tub 20 together.

The driving mechanism 100 may include a washing shaft 110 for transmitting power to the pulsator 50 and a spinning shaft 120 for transmitting rotational power to the inner tub 30, a bearing housing 130 for supporting the washing shaft 110 and the spinning shaft 120, and a drive motor 180 and 190 disposed below the bearing housing 130 for providing the driving force to the washing shaft 110 or the spinning shaft 120.

Hereinafter, the driving mechanism 100 will be described in more detail with reference to the drawings.

Figure 5:
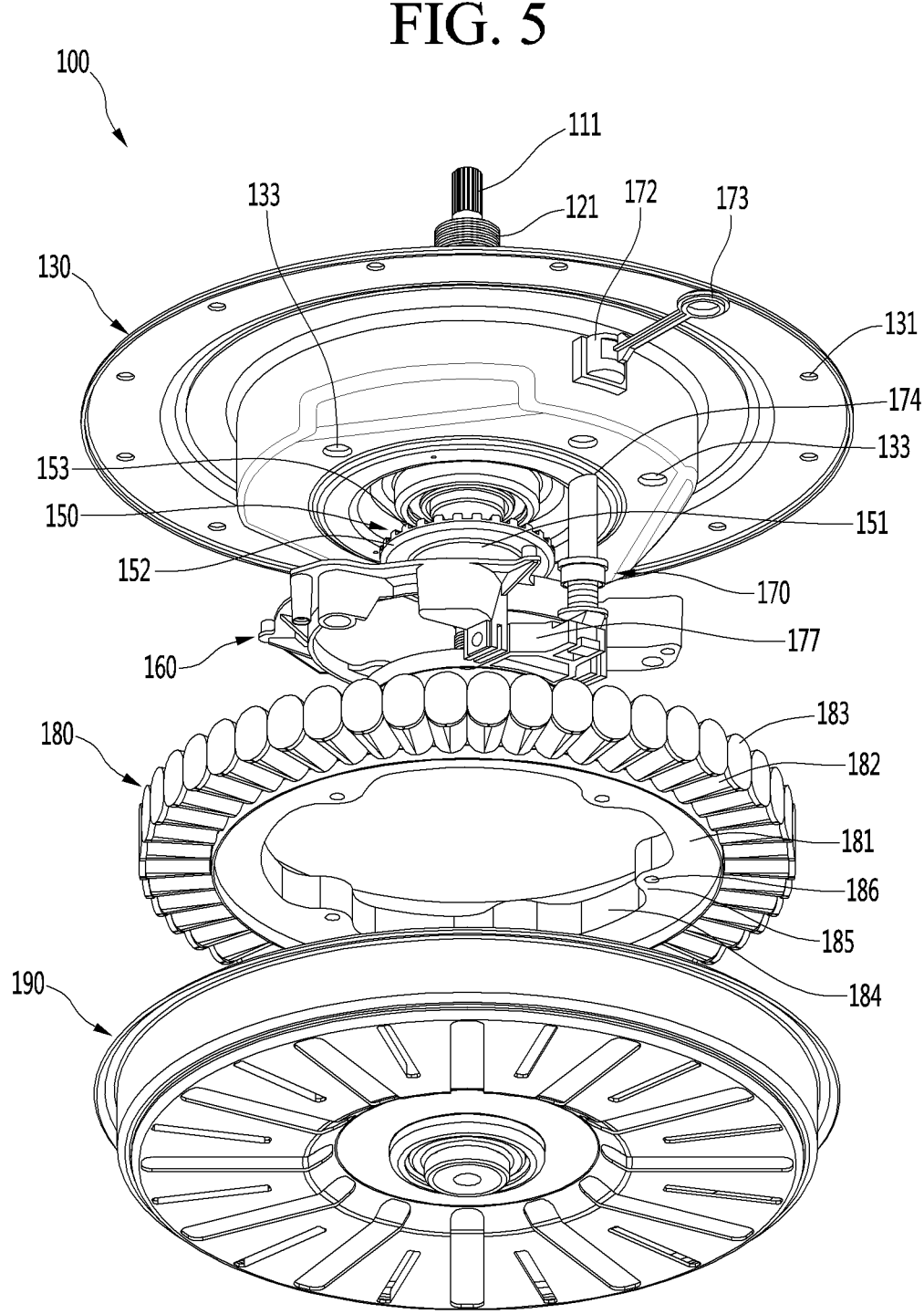
FIG. 5 is an exploded perspective view of the driving mechanism.
Figure 6:
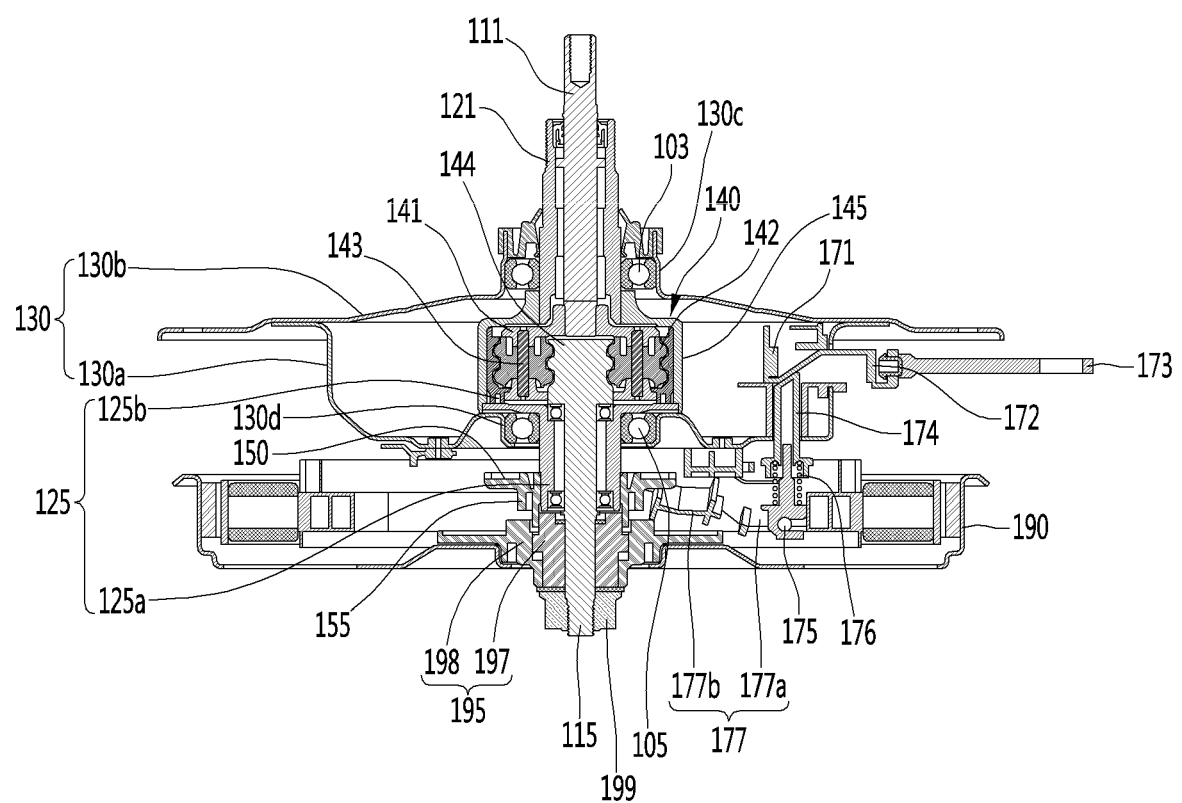
FIG. 6 is a vertical sectional view of the driving mechanism.
Figure 7:
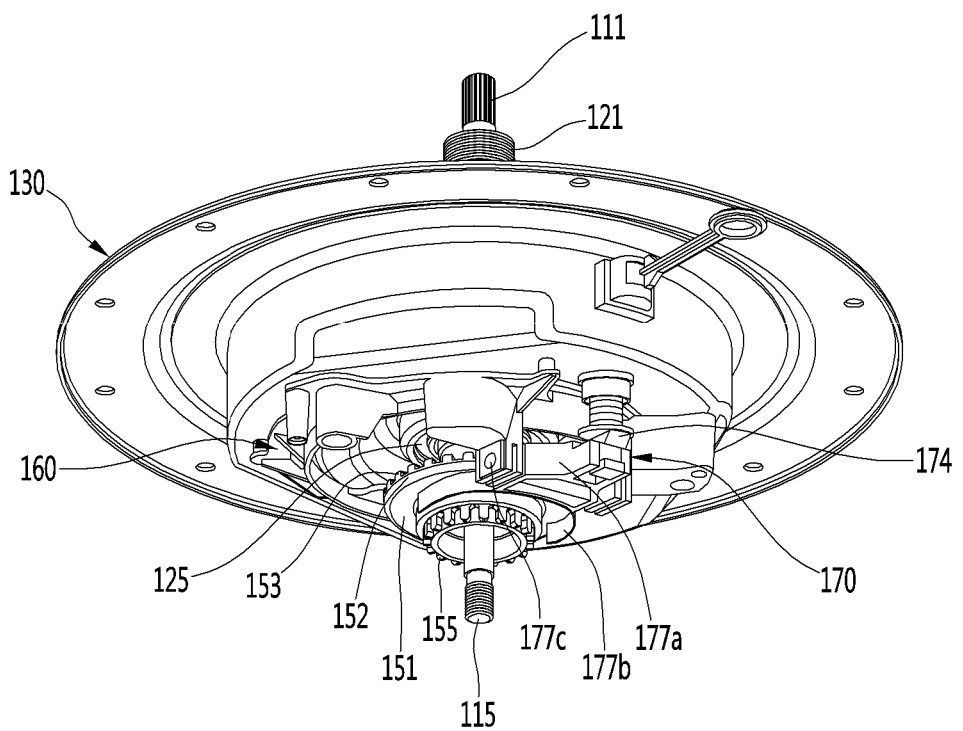
FIG. 7 is a perspective view showing a state in which a drive motor is removed from the driving mechanism.
Figure 8:
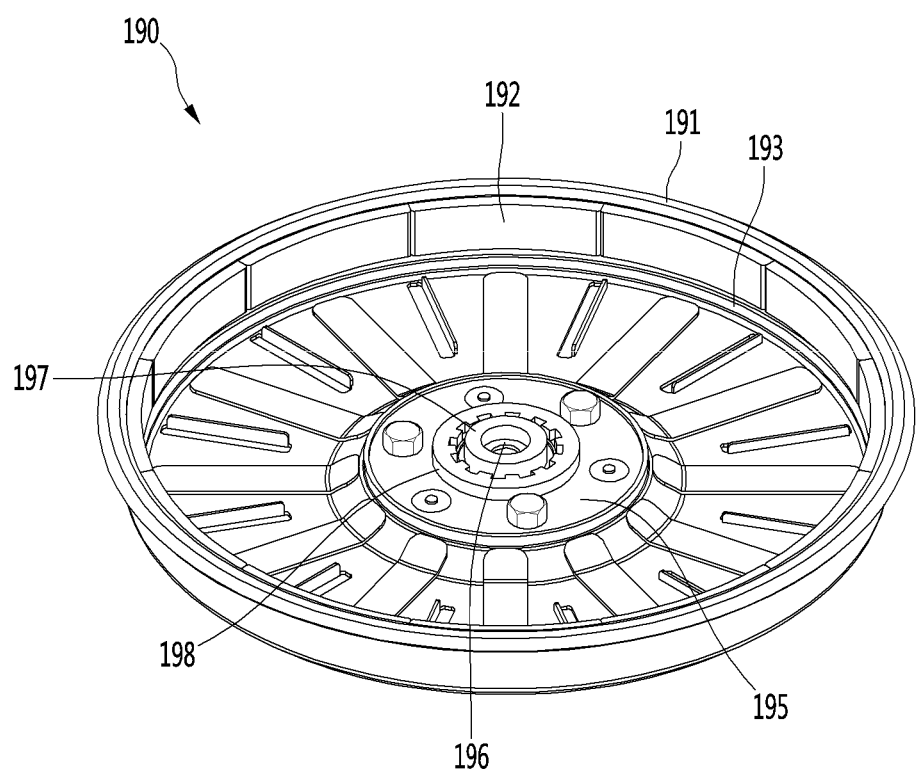
FIG. 8 is a perspective view of a rotor of the driving mechanism.

FIG. 5 is an exploded perspective view of the driving mechanism. FIG. 6 is a vertical sectional view of the driving mechanism. FIG. 7 is a perspective view showing a state in which the drive motor is removed from the driving mechanism. FIG. 8 is a perspective view of the rotor of the driving mechanism.

Referring to FIG. 5 to FIG. 8, the driving mechanism 100 includes the washing shaft 110, spinning shaft 120, bearing housing 130, and drive motor 180 and 190, as illustrated above.

In particular, the washing shaft 110 includes an upper washing shaft 111 and a lower washing shaft 115 located below the upper washing shaft 111. Further, the spinning shaft 120 includes an upper spinning shaft 121 and a lower spinning shaft 125 positioned below the upper spinning shaft 121.

The upper washing shaft 111 protrudes into the inner tub 30 through the center of the upper spinning shaft 120. One end of the upper washing shaft 111 protruding into the inner tub 30 is coupled to the pulsator 50. Further, the other end of the upper washing shaft 111 extends downward and then is connected to a planetary gear module 140 that is disposed within the bearing housing 130.

The upper washing shaft 111 is fixed to the bottom portion of the inner tub 30 and thus rotates integrally with the inner tub 30.

The lower washing shaft 115 is disposed downwardly away from the upper washing shaft 111. The bottom of the lower washing shaft 115 is coupled to the rotor 190 of the drive motor. The top of the shaft 115 is connected to the planetary gear module 140. That is, the planetary gear module 140 connects the bottom of the upper washing shaft 111 and the top of the lower washing shaft 115 to each other.

The upper washing shaft 111 is inserted into the upper spinning shaft 121. The upper spinning shaft 121 and the upper washing shaft 111 are positioned concentrically with respect to each other. One end of the upper spinning shaft 121 is coupled to the inner tub 30 so that the shaft 121 transmits a rotation force to the inner tub 30. The other end of the shaft 21 is connected to the planetary gear module 140.

The lower spinning shaft 125 is disposed downwardly away from the upper spinning shaft 121. The lower washing shaft 115 is inserted into the lower spinning shaft 125. The lower spinning shaft 125 and the lower washing shaft 115 are positioned concentrically with respect to each other. A top of the lower spinning shaft 125 is connected to the planetary gear module 140. A bottom of the shaft 125 is coupled to the rotor 190 by the coupler 150, which will be described later, whereby the shaft 125 receives the rotational force. In this regard, on the outer circumferential face of the lower spinning shaft 125, a serration for engagement with the coupler 150 is formed. Thus, the coupler 150 is configured to be movable up and down along the lower spinning shaft 125.

By virtue of the arrangement according to the present disclosure described above, the rotational force generated in the drive motor may be reduced in speed through the planetary gear module 140 and then transmitted to the upper washing shaft 111 and/or the upper spinning shaft 121. Therefore, the pulsator 50 or the inner tub 30 may be rotated at a relatively high torque, thereby enabling efficient operation of the drive motor. As a result, slimming of the drive motor may be achieved.

The bearing housing 130 supports the washing shaft 110 and the spinning shaft 120. The housing receives the planetary gear module 140 including a plurality of gears. The bearing housing 130 is disposed below the outer tub 20. The bearing housing 130 may be secured to the bottom face of the outer tub 20 by a fastener. At a top face edge portion of the bearing housing 130, a plurality of fastening holes 131 through which the fasteners pass may be defined. The plurality of fastening holes 131 may be spacedly arranged circumferentially of the housing 130. Further, the fastener passing through the fastening hole 131 is inserted into and fixed to the bottom face of the outer tub 20.

The bearing housing 130 has an interior space for receiving the planetary gear module 140. In detail, the bearing housing 130 may include a housing casing 130a for receiving the planetary gear module 140 in the center of the interior thereof, and a housing cover 130b covering an open top face of the housing casing 130a. Further, a plurality of fastening holes 131 may be defined in the outer edge of the housing cover 130b.

Further, a clutch stopper 160 may be coupled via a fastener to the bottom of the bearing housing 130. Specifically, in the bottom face portion of the housing casing 130a, a plurality of fastening holes 133 for receiving the fastener may be defined. When the fastener passes through the clutch stopper 160 and is inserted into the fastening hole 133, the clutch stopper 160 may be mounted on the bottom face of the bearing housing 130.

The number of the plurality of fastening holes 133 may be three, but the present disclosure is not limited thereto. The holes may be spaced apart from one another by the same spacing.

In one example, the upper washing shaft 111 and the upper spinning shaft 121 are inserted into the center of the top face of the bearing housing 130, i.e., into the center of the housing cover 130b.

Specifically, from the center of the housing cover 130b, a sleeve 130c for bearing insertion may extend upward. The upper spinning shaft 121 is connected to the planetary gear module 140 through the sleeve 130c. Further, an upper shaft support bearing 103 is interposed between the outer circumferential face of the upper spinning shaft 121 and the sleeve 130c. As a result, the upper spinning shaft 121 is rotatably supported by the bearing 103. When the upper spinning shaft 121 rotates, the upper shaft support bearing 103 prevents friction between the upper spinning shaft 121 and the sleeve 130c.

Further, the lower washing shaft 115 and the lower spinning shaft 125 are inserted into the bottom face center of the bearing housing 130, that is, into the center of the bottom portion of the housing casing 130a. Further, the sleeve 130d extends downward from the center of the bottom portion of the housing casing 130a. The lower spinning shaft 125 is connected to the planetary gear module 140 through the sleeve 130d. Further, between the sleeve 130d and the lower spinning shaft 125, a lower shaft support bearing 105 is provided. Thus, the lower spinning shaft 125 is rotatably supported by the bearing 105.

The drive motor is disposed under the bearing housing 130. he drive motor includes a stator 180 that generates magnetic force using the applied electric power thereto, and a rotor 190 that rotates by an induced electromotive force as generated when the stator 180 interacts with the stator 180.

Specifically, the stator 180 includes a yoke 181 with a magnetic core (not shown) stacked on its inner circumferential face, poles 183 projecting radially from the side face of the yoke 181 and being spaced apart from one another in the circumferential direction of the yoke 181, a coil 182 wound around each pole, and an insulator 184 covering the outer circumferential face of the magnetic core to prevent a direct contact between the coil 182 and the magnetic core.

Further, the stator 180 further includes a fastening protrusion 185 protruding from the inner circumferential face of the yoke 181, specifically, from the inner circumferential face of the insulator 184, toward the center of the yoke 181. The fastening protrusion 185 serves to fasten the stator 180 to the bearing housing 130 via a fastener.

The fastening protrusion 185 has a fastening hole 186 defined therein. A fastener is inserted through the fastening hole 186 into the bottom face of the bearing housing 130.

In this connection, the clutch stopper 160 is interposed between the stator 180 and the bearing housing 130. The fastener sequentially passes through the stator 180, the clutch stopper 160, and the bearing housing 130.

Further, the plurality of fastening protrusions 185 may be arranged circumferentially on the inner circumferential face of the yoke 181. Further, the plurality of fastening protrusions 185 may be spaced at equal intervals from one another.

In FIG. 5, six fastening protrusions 185 are shown to be formed on the inner circumferential face of the yoke 181. In the present disclosure, the fastener is inserted only into three of the six fastening protrusions 185. That is, the stator 180 is fastened to and supported by the bearing housing 130 at three points. In this three-point fastening structure, the vibration transmission amount is reduced compared to the conventional driving mechanism with 6 point fastening structure. Specifically, when vibrations occurring in the drive motor are transmitted through the clutch stopper 160 to the bearing housing 130, the vibration transmission amount also decreases because the number of fasteners as a transmission medium decreases from 6 to 3.

The rotor 190 rotates due to the potential difference with the stator 180. The rotor 190 is disposed to surround the outer circumferential face of the stator 180. The rotor 190, in one example, may be of a flat cylindrical shape with the top face open. Further, through the open top face, the stator 180 is disposed inside the rotor 190. In this way, an outer rotor type motor may be constructed.

Specifically, referring to FIG. 8, the rotor 190 includes a rotor frame 191 defining an appearance and a magnet 192 attached to the inner wall of the rotor frame 191. Further, on the inner wall of the rotor frame 191, a shoulder 193 is formed on which the magnet 192 is mounted and which supports the bottom of the magnet 192.

Further, at the center of the rotor 190, a shaft-retaining portion 195 for engagement with the lower washing shaft 115 and the lower spinning shaft 125 is disposed. The shaft-retaining portion 195 includes a shaft-retaining boss 197 having a shaft passing-through hole 196 for receiving the lower washing shaft 115, and teeth 198 formed on the outer surface of the shaft-retaining boss 197 and mating with the toothed portion of the coupler 150.

The shaft-retaining portion 195 is fixedly coupled to the rotor 190 and thereby rotates integrally with the rotor 190. Further, a nut 199 is inserted into an end of the lower washing shaft 115 passing through the shaft-retaining portion 195. Thus, the lower washing shaft 115 is configured to allow the shaft-retaining portion 195 and the rotor 190 to rotate integrally.

In one example, the planetary gear module 140, which constitutes the driving mechanism 100, may be means for increasing the torque transmitted to the pulsator 50 by reducing the rotation force generated in the drive motor.

In detail, the planetary gear module 140 includes a planetary gear casing 145, a sun gear 144 received within the planetary gear casing 145, and a plurality of planetary gears 142 engaging the outer circumferential face of the sun gear 144, and a carrier supporting the multiple planetary gears 142.

More specifically, within the carrier 141, a plurality of gear shafts 143, each penetrating each planetary gear, are arranged in the circumferential direction. At the center of each planetary gear 142, a through hole is defined through which the corresponding gear shaft 143 passes. With this structure, the carrier 141 can rotate with the planetary gears 142 while supporting the plurality of planetary gears 142. Further, the sun gear 144 is disposed at a center between the plurality of planetary gears 142. The sun gear 144 rotates in conjunction with the planetary gears 142. At the same time, the plurality of planetary gears 142 engage and rotate with the toothed portion formed on the inner circumferential face of the planetary gear casing 145.

Further, the top portion of the lower spinning shaft 125 is fixed to the bottom face of the planetary gear casing 145. As a result, the lower spinning shaft 125 and the planetary gear casing 145 rotate integrally. As shown, the lower spinning shaft 125 has a cylindrical shaft portion 125a through which the lower washing shaft 115 passes, and a support portion 125b of a circular shape extending from the top of the shaft portion 125a in a direction orthogonal to the shaft portion 125a (that is, in a horizontal direction). Further, the support portion 125b defines the bottom face of the planetary gear casing 145 and supports the sun gear 144 and the planetary gears 142. Further, the top of the planetary gear casing 145 is integrally connected to the upper spinning shaft 121. Further, in the top portion of the carrier 141, a rounded octagonal groove is defined. Thus, the top portion of the carrier 141 may be matched and engaged with the bottom portion of the upper washing shaft 111. Thus, the carrier 141 rotates integrally with the upper washing shaft 111.

Further, the top portion of the lower washing shaft 115 is connected to the sun gear 144. In washing mode, the rotation force generated by the drive motor is transmitted through the lower washing shaft 115 to the sun gear 144, the planetary gear 142, the carrier 141, and the upper washing shaft 111 in this order. Further, the rotational force generated by the drive motor is changed by the planetary gear module 140 such that the rotational velocity thereof is reduced while the torque thereof is increased, and then, the changed force is transmitted to the upper washing shaft 111.

Further, the driving mechanism 100 further includes the coupler 150. The coupler 150 is coupled to the outer circumferential face of the lower spinning shaft 125 such that the coupler may move vertically (up and down) along the lower spinning shaft 125. While the coupler 150 moves vertically along the lower spinning shaft 125, the coupler selectively transmits the rotation force of the rotor 190 to the lower spinning shaft 125 and/or the lower washing shaft 115.

In particular, the coupler 150 includes a cylindrical body 151 having a toothed portion formed on its top and bottom faces. At the center of the body 151, a through-hole (not shown) which the lower spinning shaft 125 penetrates may be defined. Further, on the inner circumferential face defining the through-hole, a toothed portion engaging the outer circumferential face of the lower spinning shaft 125 may be formed.

In a state in which the toothed portion formed on the inner circumferential face defining the through-hole is engaged with the toothed portion formed on the outer circumferential face of the lower spinning shaft 125, the coupler 150 descends along the lower spinning shaft 125 so that the toothed portion formed on the bottom face of the coupler 150 is coupled to the teeth 198 of the rotor 190. Further, when the coupler 150 rises, the tooth 198 of the rotor 190 and the toothed portion formed on the bottom face of the coupler 150 are separated from each other.

On the top portion of the body 151, a flange 152 radially extending from the body 151 is formed. Further, on the top face edge of the flange 152, a stop gear 153 may be formed along the circumferential direction. Further, on the bottom edge of the body 151, a connecting gear 155 engaging the teeth 198 of the shaft-retaining portion 195 is formed along the circumferential direction.

Further, a compression spring (not shown) is provided between the top surface of the coupler 150 and the lower shaft support bearing 105, to push the coupler 150 downward when an operation mode switches from a washing mode to a spinning mode.

Further, the driving mechanism 100 may further include a clutch mechanism 170 for switching the power transmission path from the drive motor to the washing shaft 110 or the spinning shaft 120 in response to the washing cycle or the spinning cycle. The clutch mechanism 170 functions to lift the coupler 150 to the raised position by actuation of the clutch motor.

Specifically, the clutch mechanism 170 includes a clutch motor (not shown) disposed under the outer tub 20, a cam (not shown) coupled to the drive shaft of the clutch motor, a lever guide 171 fixed to the inside of the bearing housing 130, and a lever 172, which is guided by the lever guide 171 to reciprocates linearly when the clutch motor is turned on/off.

Further, the clutch mechanism 170 may further include a connecting rod 173 disposed between the lever 172 and cam of the clutch motor and acting to pull the lever 172 toward the clutch motor as the clutch motor is driven, and a return spring (not shown) having one end fixed to the lever guide 171 and the other end fixed to the lever 172, to impose to the lever 172 a return force.

Further, the clutch mechanism 170 may further include an actuator 174 that descends along the sloped face of the lever 172 when the clutch motor is turned on, a plunger 175 moving up and down along a guide groove defined in the actuator 174, and a shock-absorbing spring 176 provided on the outer circumferential face of the plunger 175.

Further, on the bottom of the plunger 175, the clutch lever 177 for substantially supporting the coupler 150 is disposed. The clutch lever 177 has one end coupled to the plunger 175 and the other end contacting the coupler 150, thereby elevating the coupler 150.

In particular, the clutch lever 177 may include a connection portion 177a coupled to an end of the plunger 175, a support portion 177b extending from the connection portion 177a toward the coupler 150, and both fixing pins 177c respectively extending from both side edges of the connection portion 177a and acting as rotation centers of the clutch lever 177. The fixing pin 177c may be defined as a hinge shaft.

The connection portion 177a has one end connected to the end of the plunger 175. The support portion 177b is formed on the other end of the portion 177a. The connection portion 177a and the support portion 177b may be formed horizontally. The fixing pin 177c penetrates the connection portion 177a in the lateral direction and is coupled to a clutch stopper 160, which will be described later. That is, the support portion 177b is hinge-coupled to the clutch stopper 160 via the fixing pin 177c and is configured to be rotatable by a certain amount.

The support portion 177b protrudes from an end of the connection portion 177a toward the coupler 150, thereby functioning to lift the coupler 150. The support portion 177b functions to press the coupler 150 to an elevated position when the operating mode is switched to washing mode.

The support portion 177b branches in both directions from an end of the connection portion 177a towards the coupler 150. As a result, the support portion 177b and the connection portion 177a form a "Y" shape. Further, the two ends of the extended support portion 177b may be configured to wrap around the edge of the coupler 150.

In one example, at least a portion of the support portion 177b may wrap the outer circumferential face of the body 151 of the coupler 150. Further, a portion of the top face of the support portion 177b may contact the bottom face of the flange 151 of the coupler 150. In this connection, the support portion 177b may be disposed to hang from the outer circumferential face of the coupler 150. Alternatively, the support portion 177b may be secured to a portion of the outer circumferential face of the coupler 150. That is, the support portion 177b may contact the coupler 150 in various ways besides the method presented in the embodiment of the present disclosure.

Further, the driving mechanism 100 may further include a clutch stopper 160 that limits the amount of rotation of the clutch lever 177. The clutch stopper 160 serves to inhibit movement of the coupler 150 so that the coupler does not impact the clutch motor 110, the washing shaft 110, or the spinning shaft 120 when the coupler 150 is rotated after the coupling between the coupler 150 and the rotor 190 is released.

The clutch stopper 160 is secured via a fastener to the bottom face of the bearing housing 130.

Further, the clutch lever 177 is pivotally coupled to the clutch stopper 160 via a hinge. The clutch stopper 160 guides the clutch lever 177 to raise and lower the coupler 150 stably.

Hereinafter, an operation of the driving mechanism will be described in detail with reference to the drawings.

First, referring to FIG. 6, the operation of the driving mechanism according to washing cycle or washing mode is illustrated. When the washing command is input to the washing machine 1, a clutch motor of the clutch mechanism 170 is turned on. When the clutch motor is turned on, the connecting rod 173 is pulled toward the clutch motor and at the same time the lever 172 is pulled together with the rod.

When the lever 172 is pulled toward the clutch motor, the actuator 174 descends along the inclined face of the lever 172. In this connection, when the plunger 175 descends with the actuator 174, the clutch lever 177 is rotated upwards via the pushing force generated by the plunger 175.

In this connection, as the clutch lever 177 is moved upward, the clutch lever 177 pushes the coupler 150 upward. As a result, the coupler 150 rises along the lower spinning shaft 125. The coupling between the coupler 150 and the rotor 190 is then released, and coupling between the lower spinning shaft 125 and the coupler 150 is achieved. In this case, the coupler 150 is moved out of the rotor 190. As a result, when the rotor 190 rotates, only the washing shaft 110 rotates.

That is, in the washing mode, the toothed portion formed on the inner circumferential face of the coupler 150 engages only the toothed portion of the outer circumferential face of the lower spinning shaft 125 and does not engage the teeth 198 engaged on the lower washing shaft 115. Thus, the rotation force of the rotor 190 is transmitted only to the pulsator 50 via the washing shaft 110.

In detail, in the washing mode, the rotational force transmission process from the rotor 190 is described. The rotation force by the rotor 190 transmits to the shaft-retaining boss 197 of the rotor 190, the lower washing shaft 115 coupled to the shaft-retaining boss 197, the sun gear 144, the planetary gears 142, the carrier 141, and to the upper washing shaft 111 sequentially.

An operation of the driving mechanism according to spinning cycle or spinning mode will be described with reference to the drawings.

Figure 9:
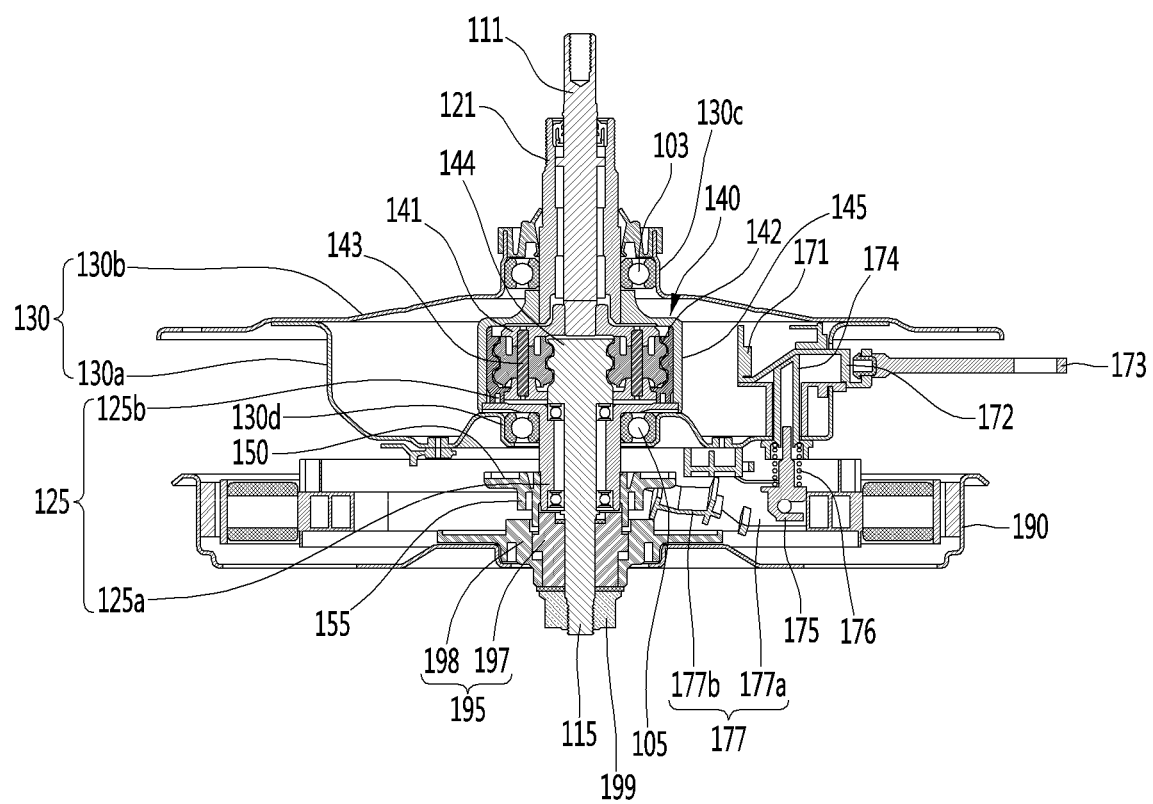
FIG. 9 is a vertical sectional view showing the driving mechanism in a spinning mode according to an embodiment of the present disclosure.

FIG. 9 is a vertical sectional view showing the driving mechanism in a spinning mode according to an embodiment of the present disclosure.

Referring to FIG. 9, when the spinning command is entered on the washing machine 1, the clutch mechanism 170 clutch motor is turned off. When the clutch motor is turned off, the connecting rod 173 as pulled toward the clutch motor is returned to its original position. The actuator 174 rises along the inclined face of the lever 172. In this connection, when the plunger 175 rises with the actuator 174, the clutch lever 177 rotates downward.

In this connection, as the clutch lever 177 is moved downward, the coupler 150 is lowered by its own weight and the pushing force from the compression spring. When the coupler 150 is fully lowered along the lower spinning shaft 125, the connecting gear 155 formed on the lower end of the coupler 150 is engaged with the teeth 198 of the rotor 190.

In other words, when the coupler 150 is fully lowered, the coupling between the coupler 150 and the rotor 190 is established while the coupled state between the coupler and the lower spinning shaft 125 is maintained. In this case, the coupler 150 simultaneously transmits the rotation force generated in the rotor 190 to the lower washing shaft 115 and the lower spinning shaft 125, such that the washing shaft 110 and the spinning shaft 120 are rotated at a high speed for spinning.

Further, the washing shaft 110 and the spinning shaft 120 are rotated integrally. Thus, When, in the planetary gear module 140, the sun gear 144 rotates with the lower washing shaft 115, the planetary gears 142 do not rotate, but revolve around the sun gear 144 with the sun gear 144 engaged therewith. Thus, the washing shaft 110 and the spinning shaft 120 rotate at the same rotational velocity.

Hereinafter, with reference to the drawings, a coupling structure between the lower washing shaft 115 and the lower spinning shaft 125 will be described in more detail.

Figure 10:
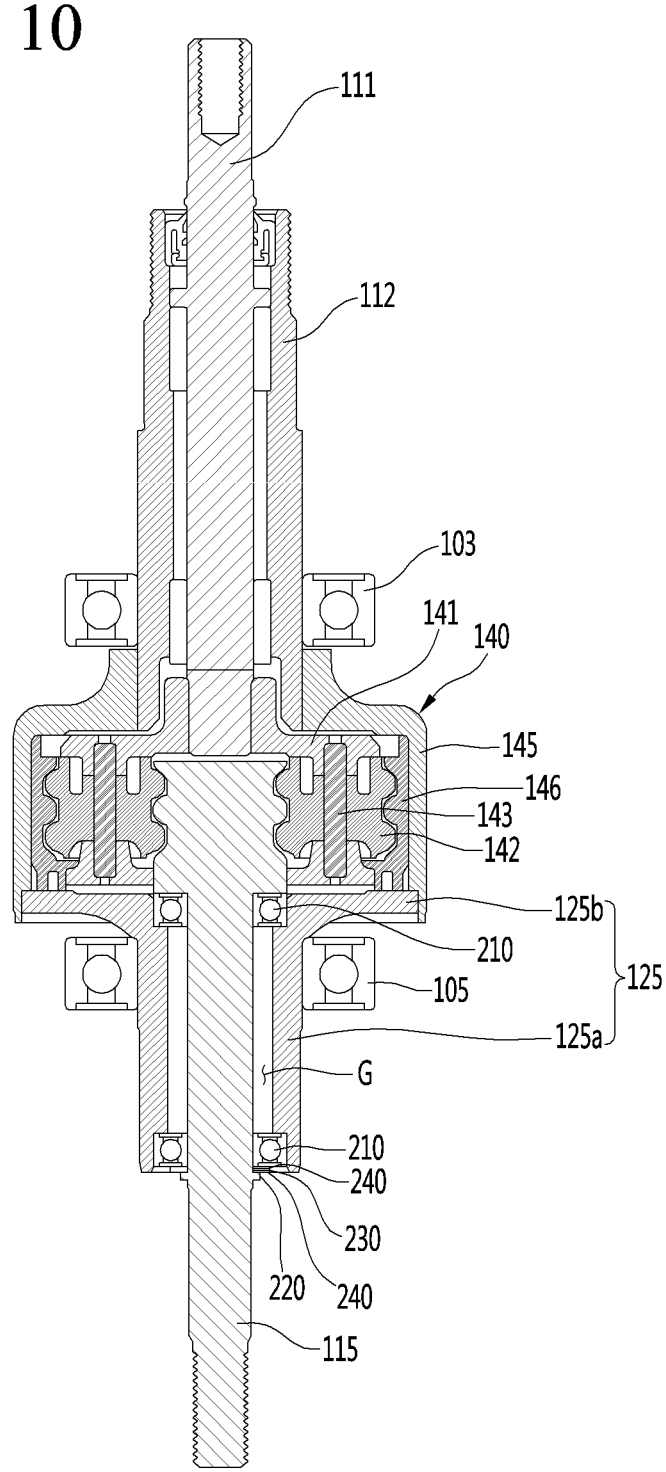
FIG. 10 is a vertical sectional view of a state in which the driving mechanism is free of a drive motor and bearing housing.
Figure 11:
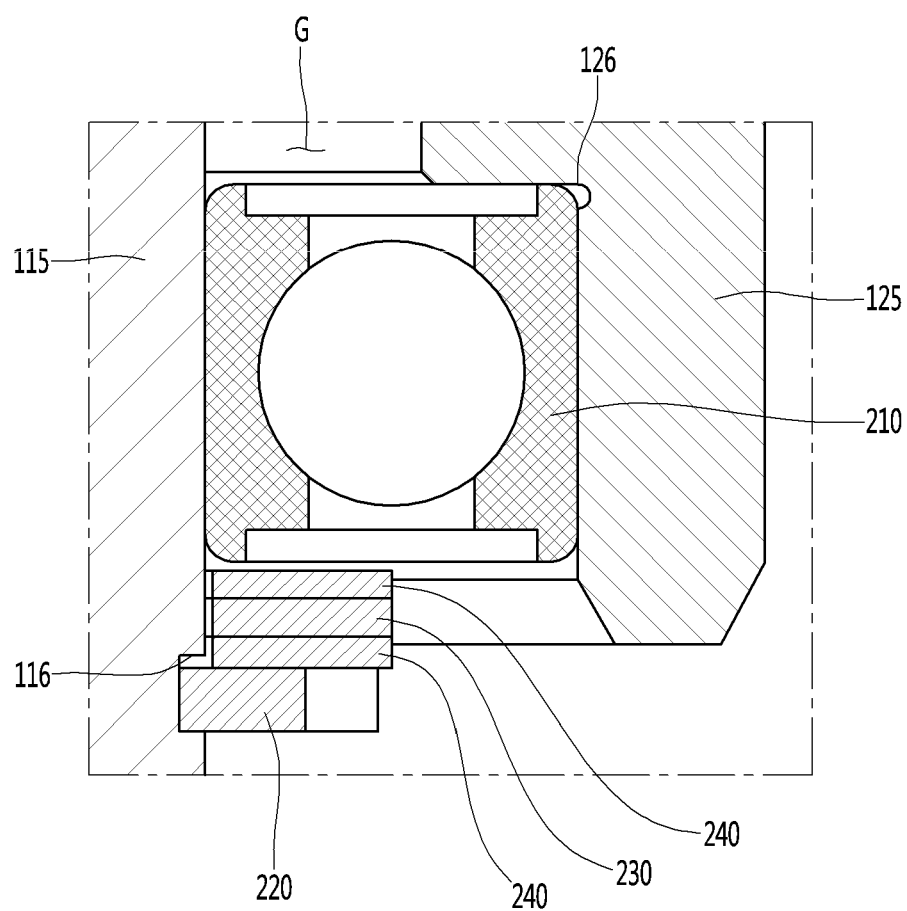
FIG. 11 is an enlarged view of a connection portion between a washing shaft and a spinning shaft in FIG. 10.
Figure 12:
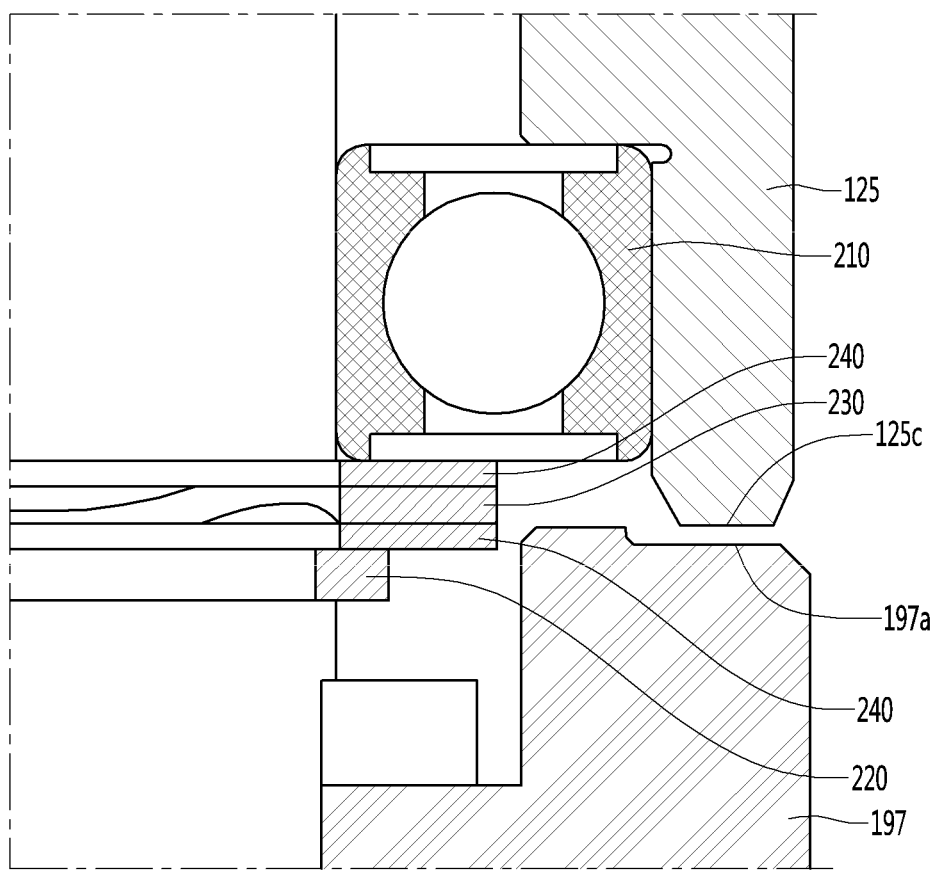
FIG. 12 shows a state in which the washing shaft is removed in FIG. 11.

FIG. 10 is a vertical sectional view showing a state in which the drive mechanism and bearing housing are removed from the driving mechanism. FIG. 11 is an enlarged view of a connection portion between the washing shaft and spinning shaft in FIG. 10. FIG. 12 shows that the washing shaft is removed in FIG. 11.

Referring to FIG. 10 to FIG. 12, an anti-friction member 210 is inserted between the spinning shaft 120 and the washing shaft 110.

In the following example, the spinning shaft 120 is illustrated as the lower spinning shaft 125 while the washing shaft 110 is illustrated as the lower washing shaft 115. However, the scope of the present disclosure is not limited thereto. The spinning shaft 120 may correspond to the upper spinning shaft 121, while the washing shaft 110 may correspond to the upper washing shaft 111.

The washing shaft 110 may include the lower washing shaft 115 having a top connected to the bottom of the sun gear 144 or integrally formed therewith, and having a bottom is connected to the rotor 190, and the upper washing shaft 111 having a top connected to the pulsator 50, and having a bottom connected to the carrier 141.

Further, the spinning shaft 120 may include the lower spinning shaft 125 having its bottom connected selectively to the rotor 190 via the coupler 150 and the top connected to the ring gear 146, and the upper spinning shaft 121 having its bottom connected to the ring gear 146 and its top connected to the inner tub.

In the above-described state, when the washing progresses, the lower spinning shaft 215 not connected to the rotor 190 is fixed or unrotated, and the lower washing shaft 115 connected to the rotor 190 is rotated. On the other hand, when the spinning proceeds, both the lower spinning shaft 215 and the lower washing shaft 115 are connected to the rotor 190 so that both the lower spinning shaft 215 and the lower washing shaft 115 are rotated.

Further, the outer circumferential face of the lower washing shaft 115 and the inner circumferential face of the lower spinning shaft 125 are spaced from each other in at least a portion thereof such that during the washing process, the lower washing shaft 115 may be rotated without being interfered by the lower spinning shaft 125. Thus, a gap G may be defined between them.

Further, the anti-friction member 210 is formed between the lower washing shaft 115 and the lower spinning shaft 125 such that in a state in which the lower washing shaft 115 is fixed to the inside of the lower spinning shaft 125, the shaft 115 may be smoothly rotated without being interfered by the lower washing shaft 125.

In one example, the anti-friction member 210 may be implemented as a bearing. In detail, the anti-friction member 210 may be implemented as a thrust ball bearing.

The thrust ball bearing is a type of bearing used to resist the thrust acting in the direction of the axis of rotation.

In another example, the anti-friction member 210 may include a plurality of bearings. In detail, in parallel with the thrust ball bearing, a radial ball bearing may be used to complement the thrust ball bearing which only receives the thrust.

In this connection, a seating groove 126 for receiving the anti-friction member 210 may be defined in at least one of the outer circumferential face of the lower washing shaft 115 or the inner circumferential face of the lower spinning shaft 125.

Once the seating groove 126 is defined, at least two faces of the anti-friction member 210 may be in contact with and supported by the outer circumferential face of the lower washing shaft 115 or the inner circumferential face of the lower spinning shaft 125. Thereby, a force for fixing the anti-friction member 210 may be secured. Further, since at least a portion of the anti-friction member 210 is accommodated in the lower washing shaft 115 or the lower spinning shaft 125, the gap G between the lower washing shaft 115 and the lower spinning shaft 125 may be smaller than the thickness of the anti-friction member 210.

Further, as described above, the planetary gear module 140 may be received inside the bearing housing 130. The planetary gear module 140 is configured to regulate the rotation ratio between the drive motor and the lower washing shaft 115 and transmit the power having the controlled rotation ratio to the upper washing shaft 111.

The planetary gear module 140 includes: a sun gear 144 configured to receive a rotation force from the drive motor to rotate, wherein the sun gear has teeth formed on an outer circumferential face thereof; a plurality of planetary gears 142, each having teeth formed on an outer circumferential face thereof, wherein the planetary gears mesh with the sun gear 144 to rotate around the sun gear together with the rotation of the sun gear; a ring gear 145 having teeth formed on an inner circumferential face thereof, wherein the ring gear 145 is positioned coaxially with the sun gear 144, wherein the ring gear 145 is meshed with the planetary gears 142; and a carrier 141 rotatably coupled to a rotation shaft of each of the plurality of planetary gears 142, wherein the carrier 141 rotates coaxially with the sun gear 144.

In this connection, the inner circumferential face of the planetary gear casing 145 may be coupled to the outer circumferential face of the ring gear 145. The planetary gear casing 145 and the ring gear 145 may be integrally formed.

In one embodiment, among the ring gear 145, the planetary gear 142, and the sun gear 144, the diameter (inner diameter) of the ring gear 145 is the largest, while the diameter (outer diameter) of the planetary gear 142 is the smallest. Further, the diameter (outer diameter) of the sun gear 144 is larger than the diameter (outer diameter) of the planetary gear 142, but smaller than the diameter (inner diameter) of the ring gear 145.

In one example, the number of planetary gears 142 may be three to four.

Further, the lower washing shaft 115 and the sun gear 144 may be integrally formed to facilitate power transmission.

Further, an outer circumferential face of the lower washing shaft 115 has a retaining groove 116 recessed inwardly therein along a circumferential direction thereof. The retaining groove 116 receives an inner circumferential face portion of a retaining ring 220, wherein an outer circumferential face of the retaining ring 220 protrudes outwardly beyond the lower washing shaft 115.

In one example, the retaining ring 220 may be formed as a 'C' ring with a cutout or opening defined in one side thereof.

Further, as described above, the seating groove 126 is defined in the inner circumferential face of the lower spinning shaft 125 to accommodate the anti-friction member 210.

According to this configuration, the top or bottom of the anti-friction member 210 may contact and supported by the seating groove 126. Since the bottom or top may bear against the retaining ring 220, the force for fixing the anti-friction member 210 may be secured.

In one example, the teeth of the gears 142, 144, and 146 that form the planetary gear module 140 may be implemented as teeth defining a helical gear.

The sawtooth line of the helical gear has an oblique shape. Further, the helical gear is a cylindrical gear having a helically curved sawtooth-line. The relative positions of the two axes of the helical gear are parallel as in the spur gear. The helical gear has a longer contact length than the spur gear, and thus can transmit a large force, and smoothly rotates, so that noise is small. The helical gear may be mainly used in general transmission devices and decelerators.

However, the helical gear is difficult to manufacture. Since the teeth line thereof are inclined, the gear may receive the thrust in the axial direction. When the gear teeth line is oriented in the right direction when viewed in the axial direction, this configuration may be referred to as a right twist. When the gear teeth line is oriented in the left direction when viewed in the axial direction, this configuration may be referred to as a left twist.

As described above, when the shape of the teeth defines the helical gear, a thrust is generated when the gears 142, 144, and 146 rotate. Thus, a collision occurs between the rising and falling part reciprocating in the vertical direction and the fixed part maintaining a relatively fixed state due to the thrust. This causes problems such as shock noise and vibration, deformation and damage of the parts.

In one example, when a thrust is generated by the helical gear rotation, the lower washing shaft 115, which is integral with the sun gear 144, reciprocates vertically. On the other hand, the lower spinning shaft 125 remains fixed. In this connection, a collision occurs between the retaining ring 220 fixed to the lower washing shaft 115 moving vertically and the anti-friction member 210 fixed to the lower spinning shaft 125 maintaining the fixed state. As a result, noise is generated, further, the retaining ring 220 or the anti-friction member 210 is damaged or deformed.

Therefore, it is necessary to additionally arrange additional means for reducing the noise caused by the collision between the anti-friction member 210 and the retaining ring 220 and mitigating the impact therebetween when the thrust is generated.

According to the present disclosure, in order to reduce the noise and impact as caused by the collision between the anti-friction member 210 and the retaining ring 220, which is caused by the relative motion between the lower washing shaft 115 and the lower spinning shaft 125, at least one washer 230 or 240 with shock-absorbing function may be interposed between the anti-friction member 210 and the retaining ring 220.

In one example, to reduce noise due to impact between the anti-friction member 210 and the retaining ring 220 by the thrust, a wave-shaped washer 230 may be inserted between the anti-friction member 210 and the retaining ring 220.

The wave-shaped washer forms a closed curve such as a circle when viewed from the axial direction. When viewed in a direction perpendicular to the axial direction, the washer has a wave curved shape.

The wave-shaped washer 230 thus configured provides elasticity in the axial direction. Accordingly, the thrust generated in the axial direction may be attenuated by the wave washer 230. Further, the washer may reduce impact and noise due to the collision of the anti-friction member 210 and the retaining ring 220.

In this embodiment, in adopting a wave-shaped washer 230, employing the wave-shaped washer 230 having an elastic restoring force or an elastic modulus K greater than thrust may allow the collision between the anti-friction member 210 and the retaining ring 220 to be completely prevented.

In this regard, the 'elastic restoring force' or 'elastic modulus K' may be selected from the range such that the wave-shaped washer 230 is not broken by the thrust and, further, after the washer is deformed by the thrust, the washer is restored to its original state. The 'elastic restoring force' or 'elastic modulus K' may vary in various ways depending on factors such as the thickness, width, diameter, material, curved shape and height of the wave-shaped washer 230. In this connection, the height of the wave-shaped washer 230 may mean the phase difference between the uppermost and lowermost ends of the wave-shaped washer 230 along the axial direction.

In another example, to prevent shock noise due to the thrust, instead of the wave-shaped washer 230, an elastic member such as a spring having an axial restoring force may be inserted between the anti-friction member 210 and the retaining ring 220.

In another example, without the wave-shaped washer 230, the anti-friction member 210 may be press-fitted into the lower washing shaft 115 to prevent the lower washing shaft 115 from moving up and down. In this case, the lower washing shaft 115 may be fixedly press-fitted into the anti-friction member 210 fixed to the lower spinning shaft 125, such that the up and down movement of the lower washing shaft 115 may be suppressed as much as possible. Thus, without the wave-shaped washer 230, the impact noise from the thrust can be reduced.

As described above, even when the wave-shaped washer 230 is inserted between the anti-friction member 210 and the retaining ring 220, the machine falls in situations such as product (machine) packaging or product placement. Thus, a large impact cannot be avoided. Further, due to the impact, the lower washing shaft 115 moves in the axial direction, such that the plastic deformation or breakage of the wave-shaped washer 230 occurs. Thus, the impact noise due to the collision between the anti-friction member 210 and the retaining ring 220, and the damage of the anti-friction member 210 and the retaining ring 220 may occur.

According to the present disclosure, in order to alleviate the momentary impact that may be applied to the wave-shaped washer 230 during the machine packaging or machine placement, in order for relieving the repetitive load applied to the wave-shaped washer 230 by the thrust, and in order to improve the repetitive fatigue life of the wave-shaped washer 230, an auxiliary washer 240 is additionally inserted between the anti-friction member 210 and the wave-shaped washer 230.

In one example, the auxiliary washer 240 may be inserted between the anti-friction member 210 and the wave-shaped washer 230.

In another example, the auxiliary washer 240 may be inserted between the wave-shaped washer 230 and the retaining ring 220.

In another example, the auxiliary washer 240 may be inserted between the anti-friction member 210 and the wave-shaped washer 230, and between the wave-shaped washer 230 and the retaining ring 220, respectively.

Further, the auxiliary washer 240 may be formed of a resin material. For example, the auxiliary washer may be made of a plastic material. As another example, the auxiliary washer may be made of a polycarbonate material. In another example, the auxiliary washer 240 may be made from a variety of materials having a shock-absorbing function.

When the auxiliary washer 240 is further inserted, abrasion and breakage of intensively loaded portions during contact between the retaining ring 220 and the wave-shaped washer 230 may be prevented. Further, the fatigue life of the wave-shaped washer 230 may be increased. Further, at the time of machine packaging or deployment, the momentary impact that may be applied to the wave-shaped washer 230 is relaxed to prevent plastic deformation or breakage of the wave-shaped washer 230.

Further, when the auxiliary washer 240 is disposed on the top and bottom of the wave-shaped washer 230, respectively, the wave-shaped washer 230 will not escape but remains between the auxiliary washers 240 even when the wave-shaped washer 230 is broken. There is also an advantage in that the noise generated by the contact of the broken wave-shaped washer 230 with the retaining ring 220 or the anti-friction member 210 can be reduced.

Further, according to the present disclosure, when the wave-shaped washer 230 and auxiliary washer 240 are deformed beyond the reference value during the machine packaging or deployment, the bottom of the lower spinning shaft 125 may be in contact with the top of the shaft-retaining boss 197 formed on the center of the rotor 190 and into which the lower washing shaft 115 is inserted.

In this connection, the 'reference value' may refer to the degree of deformation of the wave-shaped washer 230 and the auxiliary washer 240 when a load corresponding to the maximum allowable load is applied to the wave-shaped washer 230 and auxiliary washer 240, When the wave-shaped washer 230 and auxiliary washer 240 are deformed beyond the reference value, the bottom of the lower spinning shaft 125 first contacts the top of the shaft-retaining boss 197. Thereby, the phenomenon of plastic deformation of the wave-shaped washer 230 and the auxiliary washer 240 may be prevented. As the bottom of the anti-friction member 210 contacts the top of the shaft-retaining boss 197, the anti-friction member 210 may be prevented from being damaged by the impact.

Specifically, when a load corresponding to the maximum value of the allowable load is applied thereto, the auxiliary washer 240 is first deformed such that the primary impact is relaxed. Then, as the wave-shaped washer 230 is deformed, the secondary impact is mitigated. Further, the bottom spinning shaft 125 contacts the top of the shaft-retaining boss 197, thereby mitigating the tertiary impact.

This multi-stage shock mitigation mitigates machine drop impact. As a result, the impact applied to the anti-friction member 210 may be minimized. Thus, the problem that the anti-friction member 210 is broken due to impact generated when the machine is packed or placed may be solved.

Hereinafter, the results of testing the performance of the wave-shaped washer are illustrated.

FIG. 13 is a table showing the results of measuring noise generation when applying the wave-shaped washer.

In detail, FIG. 13 is a table showing the result of measuring noise as caused by the thrust based on varying thickness of the wave-shaped washer 230, varying vertical travel distance or stroke of the lower washing shaft 115 by the thrust, varying initial load, and maximum load in a state in which the wave-shaped washer 230 is inserted between the anti-friction member 210 and the retaining ring 220.

Referring to FIG. 13, it may be confirmed that upon adoption of the wave-shaped washer 230, and when the initial load is about 33 kgf, and the maximum load is 48 kgf, the measurement value of the noise generated when the lower washing shaft 115 is moved by 0.2 to 0.3 mm by the thrust of the helical gear corresponds to '0'. Generally, the thrust force from the helical gear applied to the washing machine is 25 to 40 kgf. Thus, when employing the present wave-shaped washer 230 in a conventional type washing machine, the noise due to the thrust may be removed.

For reference, the noise level of 0, shown in FIG. 13, means no noise. Noise level 1 means a case when the user put ears close to the machine and hears noise. Further, a noise level of 3 means a case when a user in front of the machine hears noise. The noise level 4 refers to a case where noise is heard at a distance of 5 m from the machine.

FIG. 14 is a table showing the results of testing the allowable load and the expected lifespan according to the specifications of the wave-shaped washer.

In a first example (conventional approach), the height H of the wave-shaped washer 230 is defined as 1.2 mm. The thickness t thereof was defined as 0.6 mm. In this connection, the height H of the wave-shaped washer 230 equals the phase difference between the top and the bottom of the wave-shaped washer 230 with respect to the axial direction.

Further, in a second example (improved approach), the height H of the wave-shaped washer 230 is defined as 0.9 mm, and the thickness t thereof was defined as 0.6 mm.

With comparing the two examples, it may be confirmed that a difference (displacement) between the heights of the wave-shaped washer 230 in the load-free state where no load is applied and in the fully loaded state where the maximum load is applied is 0.6 mm in the case of the first example (conventional approach) and is 0.3 mm in the case of the second example (improved method).

However, in the first example (conventional approach), a maximum load of about 80 kgf was applied. In the second example (improved approach), a maximum load of about 40 kgf was applied.

Referring to FIG. 14, upon the machine packing, the height H of the wave-shaped washer 230 may vary depending on the magnitude of the maximum load applied to the wave-shaped washer 230. When the maximum load corresponds to about 40 kgf, it is preferable that the height H of the wave-shaped washer 230 is defined as 0.9 mm and the thickness t thereof is defined as 0.6 mm.

On the other hand, when the maximum load applied to the wave-shaped washer 230 corresponds to about 80 kgf, it is preferable that the height H of the wave-shaped washer 230 is defined as 1.2 mm and the thickness t thereof is defined as 0.6 mm.

That is, the height H of the wave-shaped washer 230 is set to the extent that the wave-shaped washer does not enter the plastic deformation region under the maximum load generated during the machine packing process. It is desirable to select the height of the wave-shaped washer with the shortest height within a allowable range.

Further, in both the examples, the lifespan of the wave-shaped washer has been verified to be more than 1 million times.

Table 1 below shows the results of measuring the elastic modulus K, displacement, and stress based on the thickness of the wave-shaped washer.

TABLE 1

| Thickness | K | Under 40 kgf load | | Stress improvement |
|---|---|---|---|---|
| [t] | [kgf/mm] | Stroke | Stress [Mpa] | [%] |
| 0.5 | 77.6 | 0.52 | 863 | |
| 0.6 | 134.2 | 0.30 | 569.9 | 30.8 |
| 0.7 | 213 | 0.19 | 441 | 26.1 |

Referring to the Table 1, the load and stress of the wave-shaped washer are similar to the second moment and section modulus as used in the calculation of a beam stress. It may also be seen that increasing the thickness of the wave-shaped washer may improve the stress and fatigue limit.

In accordance with the present disclosure, the washing shaft may be firmly fixed within the spinning shaft, and with the spinning shaft being fixed, a single rotation of the washing shaft may be made smoothly and stably.

Further, the sun gear and the lower washing shaft may be integrally formed so that the power transmission rate may be further improved.

Further, the present washing machine may effectively reduce impact and noise generated by the collision between the retaining ring fixed to the washing shaft and the anti-friction member fixed to the spinning shaft due to the thrust generated in the axial direction.

Further, the present washing machine may completely prevent collision between the anti-friction member and the retaining ring via an application of the wave-shaped washer having an allowable load greater than thrust.

Further, the present washing machine may be capable of preventing abrasion of the intensively loaded portion during repeated contacts between the retaining ring and wave-shaped washer or between the wave-shaped washer and anti-friction member and of increasing the fatigue life of the wave-shaped washer.

Further, when the present washing machine is packaged or placed, the machine may mitigate a momentary impact that may be imposed on the wave-shaped washer, thereby preventing plastic deformation or breakage of the wave-shaped washer.

Further, even when the wave-shaped washer is broken, the wave-shaped washer is not randomly dislodged but remains between the auxiliary washers, and it is also possible to reduce the noise generated by the contact between the broken wave-shaped washer and the retaining ring or anti-friction member.

Further, when the wave-shaped washer and auxiliary washer are deformed beyond a reference value, the bottom of the lower spinning shaft contacts the top of the shaft-retaining boss first, such that the bottom of the anti-friction member contacts the top of the shaft-retaining boss, and, thus, the anti-friction member may be prevented from being damaged by the impact.

Many other variations are possible for those of ordinary skill in the art within the scope of the basic technical idea of the present disclosure. The scope of the present disclosure should be interpreted based on the scope of the appended claims.

What is claimed is:
1. A washing machine comprising:
a casing;
an outer tub located inside of the casing and configured to receive water;
an inner tub located inside of the outer tub and configured to receive laundry;
a pulsator located inside of the inner tub and configured to rotate based on receiving a driving force; and
a driving mechanism configured to provide driving force to cause rotation of at least one of the inner tub or the pulsator,
wherein the driving mechanism comprises:
a drive motor comprising a stator and a rotor,
a bearing housing located vertically below the outer tub,
a spinning shaft that has an upper end coupled to the inner tub and a lower end located closer to the rotor than the upper end, the spinning shaft defining a hollow portion that penetrates the spinning shaft from the upper end to the lower end of the spinning shaft, a coupler configured to selectively connect the spinning shaft to the rotor based on moving upward and downward along an outer circumferential surface of the lower end of the spinning shaft, the coupler comprising a cylindrical body, a washing shaft located in the hollow portion of the spinning shaft and configured to rotate the pulsator, the washing shaft having a lower part connected to the rotor and an upper part connected to the pulsator, and an anti-friction member located between the spinning shaft and the washing shaft and configured to reduce friction between the spinning shaft and the washing shaft, the anti-friction member comprising a bearing, wherein an outer circumferential surface of the washing shaft defines a retaining groove that is recessed radially inward and that extends along a circumferential direction of the washing shaft, wherein the driving mechanism further comprises:

a retaining ring that has an inner circumferential portion inserted into the retaining groove and an outer circumferential portion that protrudes radially outward of the washing shaft, a first washer located between the anti-friction member and the retaining ring, the first washer having a wave shape, a plurality of auxiliary washers that are respectively located between the anti-friction member and the first washer and between the first washer and the retaining ring, wherein the first washer and the plurality of auxiliary washers are configured to be deformed by a load applied to the anti-friction member, and a shaft-retaining boss configured to come into contact with a bottom portion of the spinning shaft based on deformation of the first washer and the plurality of auxiliary washers by the load applied to the anti-friction member, and wherein the shaft-retaining boss is configured to, based on the load corresponding to a reference value, come into contact with the bottom portion of the spinning shaft to thereby limit an impact of the load, the impact being applied to the anti-friction member after (i) the plurality of auxiliary washers are deformed to relieve a portion of the load and (ii) the first washer is deformed to relieve another portion of the load.

2. The washing machine of claim 1, wherein an outer circumferential surface of the washing shaft faces an inner circumferential surface of the spinning shaft, and wherein at least one of the outer circumferential surface of the washing shaft or the inner circumferential surface of the spinning shaft defines a seating groove configured to receive the anti-friction member.

3. The washing machine of claim 1, wherein an outer circumferential surface of the washing shaft faces an inner circumferential surface of the spinning shaft, and wherein at least a portion of the outer circumferential surface of the washing shaft is spaced apart from the inner circumferential surface of the spinning shaft.

4. The washing machine of claim 1, wherein the driving mechanism further comprises a planetary gear module that is located within the bearing housing, that is configured to define a rotational ratio of the drive motor, and that is configured to transmit driving force to the washing shaft based on the rotational ratio, the planetary gear module comprising a plurality of gears.

5. The washing machine of claim 4, wherein the planetary gear module comprises:

a sun gear configured to receive rotation force from the drive motor, the sun gear comprising teeth defined at an outer circumference of the sun gear;

a plurality of planetary gears configured to mesh with the sun gear and to rotate about the sun gear based on rotation of the sun gear, each planetary gear comprising a rotation shaft located radially outward of the sun gear and teeth defined at an outer circumference of the planetary gear;

a ring gear arranged coaxially with the sun gear and configured to mesh with the plurality of planetary gears, the ring gear comprising teeth defined at an inner circumference of the ring gear; and a carrier rotatably coupled to the rotation shaft of each of the plurality of planetary gears and configured to rotate about the sun gear.

6. The washing machine of claim 5, wherein the washing shaft comprises:

a lower washing shaft having a top portion connected to the sun gear and a bottom portion connected to the rotor; and an upper washing shaft having a top part connected to the pulsator and a bottom part connected to the carrier.

7. The washing machine of claim 5, wherein the washing shaft comprises a lower washing shaft having a bottom portion connected to the rotor, and wherein the sun gear is defined at a top portion of the lower washing shaft.

8. The washing machine of claim 5, wherein the spinning shaft comprises:

a lower spinning shaft having a bottom portion configured to be selectively connected to the rotor by the coupler and a top portion connected to the ring gear; and an upper spinning shaft having a bottom part connected to the ring gear and a top part connected to the inner tub.

9. The washing machine of claim 5, wherein the teeth of the sun gear, the teeth of the plurality of planetary gears, and the teeth of the ring gear are teeth defining a helical gear.

10. The washing machine of claim 1, wherein the outer circumferential surface of the washing shaft faces an inner circumferential surface of the spinning shaft, and wherein the inner circumferential surface of the spinning shaft defines a seating groove configured to receive the anti-friction member.

11. The washing machine of claim 1, wherein at least one of the plurality of auxiliary washers is made of a resin material.

12. The washing machine of claim 1, wherein the shaft-retaining boss defines a shaft passing-through hole that receives the washing shaft and that extends toward a central portion of the rotor.

13. The washing machine of claim 12, wherein the shaft-retaining boss comprises a top surface configured to support the bottom portion of the spinning shaft based on deformation of the first washer and the plurality of auxiliary washers by the load applied to the anti-friction member.

14. The washing machine of claim 1, wherein the washing shaft is configured to rotate relative to the spinning shaft, and wherein the anti-friction member is configured to, based on the washing shaft rotating relative to the spinning shaft, reduce friction between the spinning shaft and the washing shaft.

15. The washing machine of claim 5, wherein the anti-friction member supports a bottom surface of the sun gear.

16. The washing machine of claim 1, wherein the plurality of auxiliary washers comprise:

a first auxiliary washer in contact with the anti-friction member and the first washer; and a second auxiliary washer in contact with the first washer and the retaining ring.

17. The washing machine of claim 1, wherein the first washer and the plurality of auxiliary washers protrude radially outward relative to an outer circumferential surface of the retaining ring.

18. The washing machine of claim 1, wherein an inner diameter of the retaining ring is less than an inner diameter of each of the first washer and the plurality of auxiliary washers, and wherein an outer diameter of the retaining ring is less than an outer diameter of each of the first washer and the plurality of auxiliary washers.

19. The washing machine of claim 1, wherein an outer circumferential surface of the first washer is flush with outer circumferential surfaces of the plurality of auxiliary washers.

20. The washing machine of claim 1, wherein the shaft-retaining boss is further configured to, based on the load being less than the reference value, be spaced apart from the bottom portion of the spinning shaft, and wherein the reference value is less than a threshold load that causes a plastic deformation of the first washer and the plurality of auxiliary washers.

* * * * *